(12) United States Patent
Stefansson et al.

(10) Patent No.: US 7,975,001 B1
(45) Date of Patent: Jul. 5, 2011

(54) BI-DIRECTIONAL COMMUNICATION IN A PARALLEL PROCESSING ENVIRONMENT

(75) Inventors: Halldor Narfi Stefansson, Natick, MA (US); Loren Dean, Natick, MA (US); Roy Lurie, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 380 days.

(21) Appl. No.: 11/706,805

(22) Filed: Feb. 14, 2007

(51) Int. Cl.
G06F 15/16 (2006.01)
(52) U.S. Cl. .................... 709/203; 709/201; 709/223
(58) Field of Classification Search .............. 709/203
See application file for complete search history.

(56) References Cited

U.S. PATENT DOCUMENTS

| | | | | |
|---|---|---|---|---|
| 6,112,225 | A * | 8/2000 | Kraft et al. ............ | 709/202 |
| 6,463,457 | B1 * | 10/2002 | Armentrout et al. ...... | 709/201 |
| 6,963,917 | B1 * | 11/2005 | Callis et al. ............ | 709/227 |
| 7,103,628 | B2 * | 9/2006 | Neiman et al. .......... | 709/201 |
| 7,134,073 | B1 * | 11/2006 | Fiedorowicz et al. .... | 715/235 |
| 2003/0014611 | A1 * | 1/2003 | Ferris .................... | 712/35 |
| 2003/0101023 | A1 | 5/2003 | Shah et al. | |
| 2004/0098447 | A1 * | 5/2004 | Verbeke et al. ......... | 709/201 |
| 2004/0215829 | A1 * | 10/2004 | Hubbard et al. ........ | 709/246 |
| 2005/0015437 | A1 | 1/2005 | Strait | |
| 2005/0021795 | A1 * | 1/2005 | Kuroshima et al. ..... | 709/229 |
| 2006/0041859 | A1 | 2/2006 | Vrancic et al. | |
| 2006/0059251 | A1 * | 3/2006 | Cunha et al. ........... | 709/223 |
| 2006/0212882 | A1 | 9/2006 | Foti et al. | |
| 2007/0143248 | A1 * | 6/2007 | Uppala .................... | 707/2 |
| 2008/0022264 | A1 | 1/2008 | Macklem et al. | |
| 2009/0006167 | A1 | 1/2009 | Toussaint et al. | |

OTHER PUBLICATIONS

Ron Choy, Alan Edelman, Parallel MATLAB: Doing it Right, Nov. 15, 2003.*
Condor High Throughput Computing, "What is Condor?" retrieved online at http://www.cs.wisc.edu/condor/description.html (2007).
Condor High Throughput Computing, "An Overview of the Condor System," retrieved online at http://www.cs.wisc.edu/condor/overview/ (2007).
Condor High Throughput Computing, "Top Five Myths About Condor," retrieved online at http://www.cs.wisc.edu/condor/myths.html (2007).
Condor High Throughput Computing, "Condor Checkpointing," retrieved online at http://www.cs.wisc.edu/condor/checkpointing.html (2007).
Condor High Throughput Computing, "Classified Advertisements," retrieved online at http://www.cs.wisc.edu/condor/classad/ (2007).

(Continued)

*Primary Examiner* — Tammy T Nguyen
*Assistant Examiner* — Natisha Cox
(74) *Attorney, Agent, or Firm* — Nelson Mullins Riley & Scarborough LLP; Kevin J. Canning

(57) ABSTRACT

A computer-readable medium including executable instructions for performing parallel processing on behalf of a client operating a technical computing environment is provided. The medium may include instructions for receiving a request from the client. The medium may include instructions for commencing parallel processing on behalf of the client based on the received request and instructions for sending a query to the client, the query related to the parallel processing. The medium may include instructions for receiving an answer from the client, the answer received when the client has processed the query. The medium may include instructions for generating a result based on the parallel processing, the result used by the client or by another device to perform an operation.

83 Claims, 18 Drawing Sheets

OTHER PUBLICATIONS

Condor High Throughput Computing, "Condor Standalone ClassAd Catalog," retrieved online at http://www.cs.wisc.edu/condor/catalog/ (2007).
Condor High Throughput Computing, "Condor-G," retrieved online at http://www.cs.wisc.edu/condor/condorg/ (2007).
Condor High Throughput Computing, "Condor or Condor-G: Which one is right for me?" retrieved online at http://www.cs.wisc.edu/condor/condorg/versusG.html (2007).
Condor High Throughput Computing, "DiskRouter," retrieved online at http://www.cs.wisc.edu/condor/diskrouter/ (2007).
Condor High Throughput Computing, "Condor Trigger," retrieved online at http://www.cs.wisc.edu/condor/trigger/ (2007).
Condor High Throughput Computing, "MW Overview," retrieved online at http://www.cs.wisc.edu/condor/mw/overview.html (2007).
Condor, "Birdbath," retrieved online at http://www.cs.wisc.edu/condor/birdbath/ (2006).
Condor, "Bypass," retrieved online at http://www.cs.wisc.edu/condor/bypass/ (2007).
Condor, "Chirp," retrieved online at http://www.cs.wisc.edu/condor/chirp/ (2007).
Condor, "FTP-Lite," retrieved online at http://www.cs.wisc.edu/condor/ftp_lite/ (2007).
Condor, "The Grid Console," retrieved online at http://www.cs.wisc.edu/condor/bypass/examples/grid-console/ (2007).
Condor, "Hawkeye," retrieved online at http://www.cs.wisc.edu/condor/hawkeye/ (2007).
Condor, "NeST: Network Storage, Flexible Commodity Storage Appliances," retrieved online at http://www.cs.wisc.edu/condor/nest/ (2007).
Condor, "STORK: A Scheduler for Data Placement Activities in the Grid," retrieved online at http://www.cs.wisc.edu/condor/stork/ (2007).
Condor, "Hunting for Wasted Computing Powder, New Software for Computing Networks Puts Idle PC's to Work," retrieved online at http://www.cs.wisc.edu/condor/doc/WiscIdea.html (2007).
Frey, James et al., "Condor-G: A Computation Management Agent for Multi-Institutional Grids," retrieved online at http://www.cs.wisc.edu/condor/doc/condorg-hpdc10.pdf (2007).
GCB: Generic Connection Brokering, retrieved online at http://www.cs.wisc.edu/~sschang/firewall/gcb/index.htm (2007).
Geer, David, "Taking the Graphics Processor beyond Graphics," retrieved online at http://ieeexplore.ieee.org/iel5/2/32339/01510560.pdf?tp=&isnumber=&arnumber=1510560 (2005).
Goux, Jean-Pierre et al., "Metacomputing and the Master-Worker Paradigm," retrieved online at http://citeseer.ist.psu.edu/cache/papers/cs/17913/ftp:zSzzSzinfo.mcs.anl.govzSzpubzSztech_reportszSzreportszSzP792.pdf/goux00metacomputing.pdf (2000).
Kulkarni, Sanjeev, "An Intelligent framework for Master-Worker Applications in a dynamic Metacomputing Environment," retrieved online at http://209.85.165.104/search?q=cache:dcoAFCWtFzgJ:www.cs.wisc.edu/condor/mw/masters.doc+An+Intelligent+framework+for+Master-Worker+Applications+in+a+dynamic+Metacomputing+Environment &hl=en&ct=clnk&cd=1&gl=us (2001).
Parker, Ann, "Built for Speed, Graphics Processors for General-Purpose Computing," retrieved online at http://72.14.209.104/search?q=cache:juEMGJAVMUsJ:www.llnl.gov/str/November05/pdfs/11_05.3.
pdf+Built+for+Speed,+Graphics+Processors+for+General-Purpose+Computing,&hl=en&ct=clnk&cd=3&gl=us (2005).
Tutorial: Luebke, David, "General-Purpose Computation on Graphics Hardware, GPGPU," SIGGRAPH 2004 retrieved online at http://www.gpgpu.org/s2005/slides/3 (2005).
Tutorial: Thain, Greg, "Master-Worker Tutorial, Condor Week 2006," http://www.cs.wisc.edu/condor/CondorWeek2006/presentations/thain_mw_tutorial.ppt (2006).
Tutorial: Farrellee, Matthew et al., "Developer APIs to Condor + A Tutorial on Condor's Web Service Interface," retrieved online at http://www.cs.wisc.edu/condor/CondorWeek2006/presentations/farrellee_tannenba_APIs.ppt (2006).
Wilson, Tracy V. et al., "How Graphics Cards Work," retrieved online at http://computer.howstuffworks.com/graphics-card.htm (2007).
Condor® Version 6.6.11 Manual, retrieved online at http://www.cs.wisc.edu/condor/manual/v6.6/condor-V6_6_11-Manual.pdf (2006).
Raman, Rajesh et al., "Policy Driven Heterogeneous Resource Co-Allocation with Gangmatching," *Proceedings of the 12th IEEE International Symposium on High Performance Distributed Computing*, pp. 80-89 (2003).
Roy, Alain et al., "Condor and Preemptive Resume Scheduling," *Grid Resource Management: State of the Art and Future Trends*, Klumer Academic Publishers, Jarek Nabrzyski, Ed., pp. 135-144 (2003).
Thain, Douglas et al., "Distributed Computing in Practice: The Condor Experience," *Concurrency: Pract. Exper.*, pp. 0-20 (2004).
Fernández, Enol et al., "Resource Management for Interactive Jobs in a Grid Environment," *2006 IEEE International Conference on Cluster Computing*, pp. 1-10 (2006).
Kupczyk, Miroslaw et al., "New Generation Environment for Grid Interactive MPI Applications," *CrossGrid technical achievements, Amsterdam*, retrieved online at http://desktop.psnc.pl/docs/pdf/md_ras_jss.pdf (2005).
Reuther, Albert I. et al., "Technology Requirements for Supporting On-Demand Interactive Grid Computing," *Proceedings of the HPCMP Users Group Conference*, pp. 320-327 (2005).
Talwar, Vanish et al., "An Environment for Enabling Interactive Grids," *IEEE International Symposium on High Performance Distributed Computing (HPDC-12)* pp. 1-10 (2003).
International Search Report for Application No. PCT/US2008/001921, dated Sep. 5, 2008.

* cited by examiner

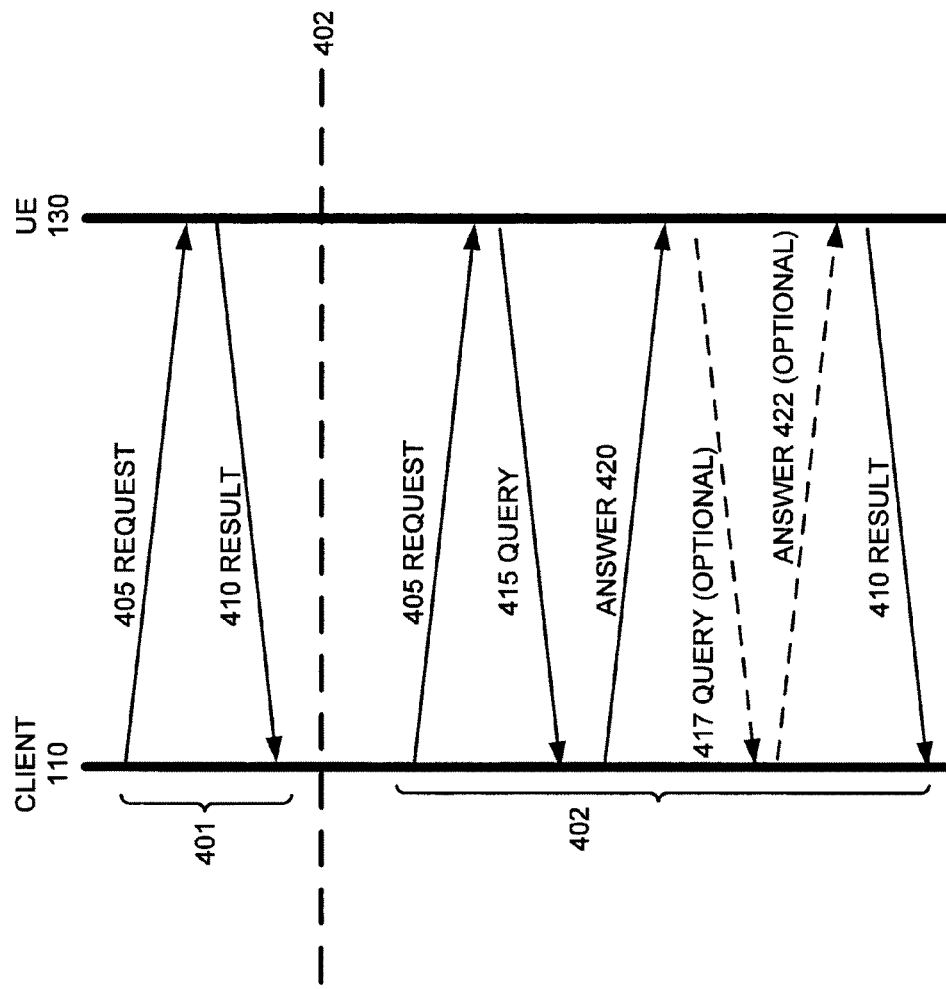

ically computing environment is provided. The medium may include instructions for receiving a request from the client. The medium may include instructions for commencing parallel processing on behalf of the client based on the received request and instructions for sending a query to the client, the query related to the parallel processing. The medium may include instructions for receiving an answer from the client, the answer received when the client has processed the query. The medium may include instructions for generating a result based on the parallel processing, the result used by the client or by another device to perform an operation.

BI-DIRECTIONAL COMMUNICATION IN A PARALLEL PROCESSING ENVIRONMENT

BACKGROUND INFORMATION

Certain computations may benefit from parallel processing. For example, a complex simulation may run faster when the simulation is divided into portions and the portions are simultaneously run on a number of processing devices in a parallel fashion. Parallel computing arrangements may include a controller that determines how an application should be divided and what application portions go to which parallel processors. For example, a host computer that is running the simulation may act as the controller for a number of parallel processors.

Parallel processors may receive instructions and/or data from the controller and may return a result to the controller. Conventional parallel processing environments may allow parallel processors to send only certain types of messages back to a controller. For example, a parallel processor may be allowed to send only results and errors to a controller. More complex types of communications, such as a request for additional resources, requests for additional information, requests for code, etc., may not be able to originate from a parallel processor in conventional parallel processing environments.

Conventional parallel processing environments may not be able to perform certain types of processing efficiently due to the limited types of messages that can be exchanged between the parallel processor and the controller. For example, a parallel processor may not be able to inform a controller that its configuration is different from a configuration that the controller assumes is present on the parallel processor (e.g., when the controller assumes that a parallel processor is running a first type of operating system when the parallel processor is actually running a second type of operating system that differs from the first type of operating system).

SUMMARY

In accordance with an embodiment, a method for performing parallel processing on behalf of a technical computing environment is provided. The method may include sending a request to a unit of execution. The method may include receiving a query from the unit of execution, where the query is related to parallel processing performed on behalf of the technical computing environment. The method may include receiving a result from the unit of execution, where the result is produced by the unit of execution in response to the parallel processing and where the result is generated after the unit of execution receives an answer. The method may include using the result to perform an operation on behalf of a user or on behalf of the technical computing environment.

In accordance with another embodiment, a computer-readable medium including executable instructions for performing parallel processing on behalf of a technical computing environment is provided. The medium may include instructions for sending a request to a unit of execution that performs parallel processing. The medium may include instructions for receiving a query from the unit of execution, where the query is related to parallel processing performed on behalf of the technical computing environment. The medium may include instructions for receiving a result from the unit of execution, the result produced by the unit of execution in response to the parallel processing after the unit of execution receives an answer. The medium may include instructions for using the result to perform an operation an operation on behalf of a user or on behalf of the technical computing environment.

In accordance with still another embodiment, a computer-readable medium including executable instructions for performing parallel processing on behalf of a client operating a techn In accordance with yet another embodiment, a computing device operating in a parallel processing system is provided. The computing device may include first logic to send a request for parallel processing to a unit of execution, where the request is on behalf of a technical computing environment. The first logic may further receive a query from the unit of execution, the query related to the parallel processing. The first logic may further receive a result from the unit of execution, where the result is produced in response to the parallel processing. The computing device may include second logic to process the result and to perform an operation based on the processing.

In accordance with still another embodiment, a system is provided. The system may include first logic to identify a unit of execution based on information in a request and to process a query received from the unit of execution, the query related to parallel processing performed on behalf of a requesting device operating a technical computing environment. The first logic may further generate an answer to the query. The system may include second logic to receive the request on behalf of the requesting device, where the request is for parallel processing and to send the request to the unit of execution, where the unit of execution performs the parallel processing on behalf of the requesting device, the parallel processing further generating a result that is processed by the requesting device to perform an operation. The second logic may further receive the query prior to the requesting device processing the result.

In accordance with yet another embodiment, a computer-readable medium including executable instructions for providing a user interface to display information about parallel processing performed on behalf of a technical computing environment is provided. The medium may include instructions for displaying information related to a query received from a unit of execution performing parallel processing on behalf of a client, the query requesting that the client perform an operation, where the operation facilitates the parallel processing. The medium may include instructions for displaying an answer to the query, where the answer includes information that assists the unit of execution with the parallel processing. The medium may include instructions for displaying information about a result to a user associated with the client.

In accordance with still another embodiment, a method for interacting with a unit of execution performing parallel processing on behalf of a technical computing environment is provided. The method may include displaying information about a query received from the unit of execution when the unit of execution is performing parallel processing on behalf of the technical computing environment. The method may include displaying information about an answer to the query, where the answer is used by the unit of execution to complete the parallel processing. The method may include displaying information about a result, where the result is received from the unit of execution when the parallel processing is completed, and wherein a client performs processing based on the result to produce an output for a user or for a device.

In accordance with yet another embodiment, a computer readable medium including executable instructions for performing parallel processing on behalf of a technical computing environment is provided. The medium may include instructions for passing a request from the technical computing environment to one or more clusters operating on a computing grid to perform parallel processing. The medium may include instructions for passing a query from one of the one or more clusters to the technical computing environment when the one of the one or more clusters is performing parallel processing. The medium may include instructions for passing an answer to the one of the one or more clusters, where the answer is generated in response to the query. The medium may include instructions for passing a result from the one of the one or more clusters to the technical computing environment, where the technical computing environment uses the result to perform processing on behalf of a user or a device.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 4A illustrates an exemplary timing diagram showing an exchange of messages between a client and a unit of execution according to an exemplary embodiment;

DETAILED DESCRIPTION

Figure 1A:
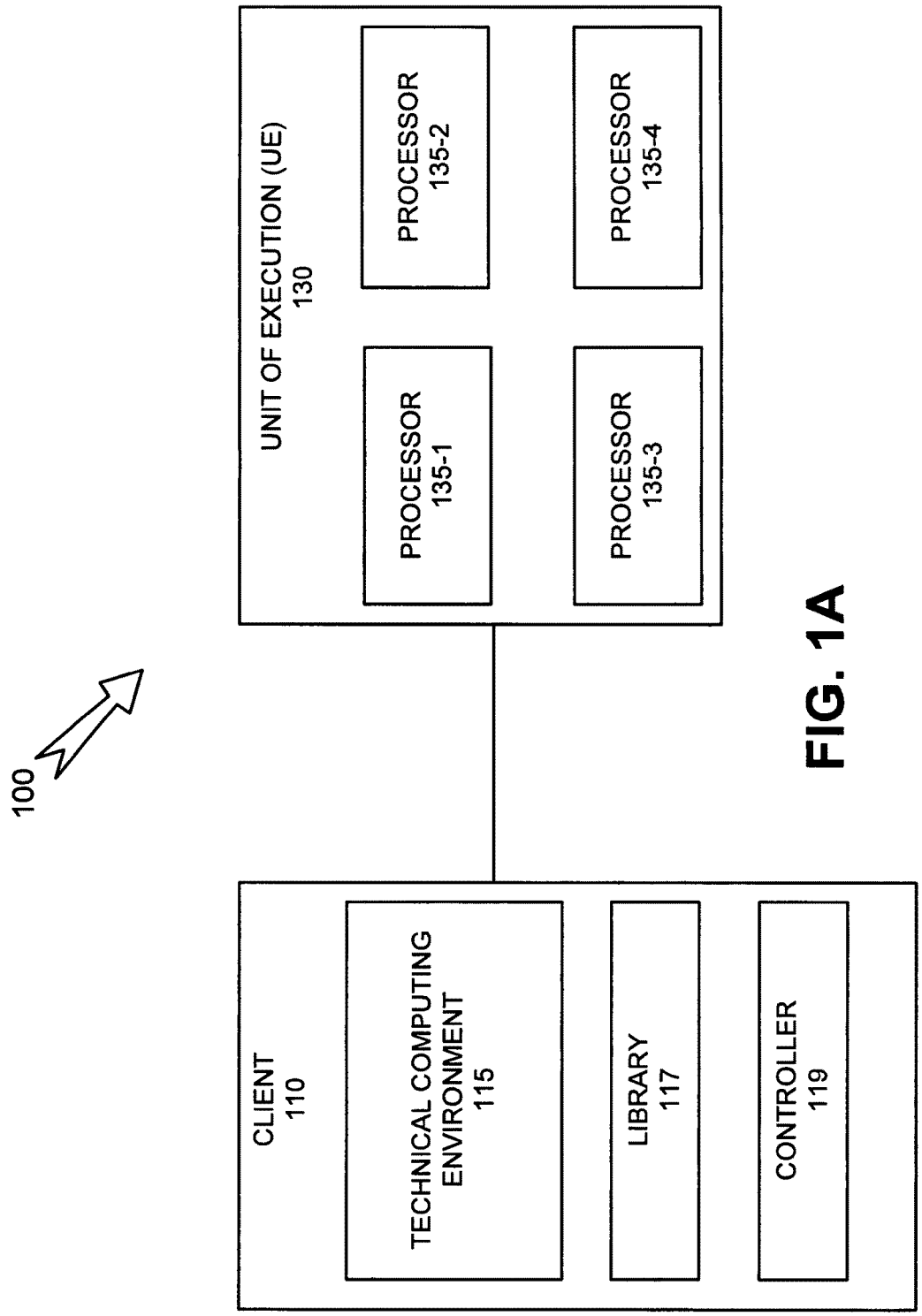
FIG. 1A illustrates an exemplary system that can be configured to practice an exemplary embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Conventional distributed processing systems, such as parallel processing systems, may include uni-directional communication between a controller and a parallel processor (e.g., a computing grid). The uni-directional communication may allow the controller to send instructions and data to the parallel processor, but may not allow the parallel processor to send instructions, requests, etc., back to the controller. As a result, benefits associated with parallel processing may be limited.

For example, a controller may send a task to a parallel processing device based on an assumption that the parallel processing device is properly configured to execute the task. Assume, for sake of example, that the parallel processing device does not have enough memory to efficiently execute the task. In conventional implementations, the parallel processing device may not be able to request additional memory resources, such as requesting the use of excess memory on the controller, since the parallel processing device cannot participate in bi-directional communication with the controller.

Exemplary embodiments disclosed herein enable a controller and a unit of execution to participate in bi-directional communications. As used herein, unit of execution refers to a device that performs parallel processing activities. For example, a unit of execution may perform parallel processing activities in response to a request received from a client. A unit of execution may perform substantially any type of parallel processing, such as task, data, or stream processing, using one or more devices. For example in one implementation, a unit of execution may include a single processing device that includes multiple cores and in another implementation, the unit of execution may include a number of processors. Devices used in a unit of execution may be arranged in substantially any configuration (or topology), such as a grid, ring, star, etc.

Using the above example, an exemplary embodiment of a unit of execution can inform the controller (e.g., a client that sent a request to the unit of execution) that it does not have enough memory to efficiently perform a parallel processing activity on behalf of the client. In addition, the unit of execution can query the controller as to whether additional memory is available on the controller or elsewhere in a system (e.g., on another device networked to the controller). The unit of execution may further request use of excess memory on the controller or the other device. For example, the unit of execution may task the controller to perform an operation (e.g., information storage and/or retrieval operations) on behalf of the unit of execution. The controller may receive information from the unit of execution and may store the information for later use by the unit of execution. When the unit of execution is finished with parallel processing activities on behalf of the controller, the unit of execution may return a result to the controller.

Exemplary embodiments may use bi-directional communication between a controller and a unit of execution to identify and/or to take advantage of available resources (e.g., unused memory, unused processor cycles, etc.), specialized hardware (e.g., display devices, unique interfaces, etc.), specialized software (e.g., functions that may be needed by one device but that may not be present on that device, unique software applications, etc.), etc. Exemplary embodiments may further perform bi-directional communications within a single device (e.g., components operating within a single enclosure), among two devices connected via a link (e.g., a dedicated link, a bus, etc.), among two or more devices connected to a network (e.g., a wired network, a wireless network, etc.), etc.

Parallel processing, as used herein, refers to substantially any type of processing that can be distributed across two or more processing resources (e.g., microprocessors, clusters, labs, etc.). For example, in one embodiment, parallel processing may refer to task parallel processing where a number of tasks are processed at substantially the same time on a number of processing devices. In task parallel processing each task may be processed independently of other tasks executing at the same time (e.g., a first processor executing a first task may not communicate with a second processor executing a second task). In another embodiment, parallel processing may refer to data parallel processing, where data (e.g., a data set) is parsed into a number of portions that are executed in parallel using two or more processing devices. In data parallel processing, processing devices and/or data portions may communicate with each other as processing progresses. In still another embodiment, parallel processing may refer to stream parallel processing (also referred to as pipeline parallel processing). Stream parallel processing may use a number of processing devices arranged in series (e.g., a line) where a first processor produces a first result that is fed to a second processor that produces a second result. Stream parallel processing may be prevalent in certain fields, such as signal processing, image processing, etc. Other embodiments may combine two or more of task, data, or stream parallel processing techniques alone or with other types of processing techniques to form hybrid-parallel processing techniques without departing from the spirit of the invention.

Exemplary System

FIG. 1A illustrates an exemplary system 100 that can be configured to practice an exemplary embodiment. System 100 may include client 110 and unit of execution 130 (hereinafter UE 130). The embodiment of FIG. 1A is exemplary and other embodiments may include more devices, fewer devices, and/or devices in arrangements other than the arrangement of FIG. 1A.

Client 110 may include a device capable of sending data to or receiving data from another device, such as UE 130. "Data," as used herein, may refer to any type of machine-readable information having substantially any format that may be adapted for use in one or more networks and/or with one or more devices. Data may include digital information or analog information. Data may further be packetized and/or non-packetized.

Client 110 may be a computer, such as a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results.

In one embodiment, client 110 may include a technical computing environment 115, a library 117 and a controller 119. Other embodiments of client 110 may include more components, fewer components, or the illustrated components in alternate configurations.

Technical computing environment (TCE) 115 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, TCE 115 may include a dynamically typed language that can be used to express problems and/or solutions in mathematical notations familiar to those of skill in the relevant arts. For example, TCE 115 may use an array as a basic element, where the array may not require dimensioning. In addition, TCE 115 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 115 may further provide mathematical functions and/or graphical tools (e.g., for creating plots, surfaces, images, volumetric representations, etc.). In one implementation, TCE 115 may provide these functions and/or tools using toolboxes (e.g., toolboxes for signal processing, image processing, data plotting, parallel processing, etc.). In another implementation, TCE 115 may provide these functions as block sets. In still another implementation, TCE 115 may provide these functions in another way, such as via a library, etc. TCE 115 may be implemented as a text based environment, a graphically based environment, or another type of environment, such as a hybrid environment that is both text and graphically based.

Library 117 may include hardware and/or software based logic that operates with TCE 115 to perform certain operations. For example, an embodiment of library 117 may include functions to perform certain operations (e.g., signal processing, image processing, parallel processing, data display, etc.) in a text based environment. In another embodiment, library 117 may include graphical representations (e.g., blocks, icons, images, etc.) to perform certain operations in a graphically based environment (e.g., a gain block, a source block, a filter block, a discrete event generator block, etc.). In still other embodiments, library 117 may be configured to perform other operations using text, graphics, etc.

Controller 119 may include hardware and/or software based logic to perform control operations on behalf of a device or component in system 100. For example, controller 119 may perform operations to select and/or control parallel processing activities performed by UE 130 on behalf of client 110. In one implementation, controller 119 may operate alone, or with other logic on client 110, to parse an application, problem, etc., into portions that can be processed in a parallel fashion. Controller 119 may send the portions to UE 130 for parallel processing. Controller 119 may operate on results received from UE 130 (e.g., results from processors 135-1, 135-2, 135-3, or 135-4), may assemble the results into a single result for use on client 110 (e.g., to a display device on client 110), and/or may make the results available to other applications, objects, devices, etc.

UE 130 may include a device that performs parallel processing. In one implementation, UE 130 may perform parallel processing activities on behalf of another device, such as client 110. In another implementation, UE 130 may perform parallel processing activities on behalf of itself or on behalf of a host of which UE 130 is a part. Implementations of UE 130 may perform parallel processing in a number of ways, such as by performing parallel processing activities related to task parallel processing, data parallel processing, stream parallel processing, etc.

UE 130 may perform parallel processing using processing devices resident on UE 130 and/or using processing devices that are remote with respect to UE 130. For example, UE 130 may determine that five processors are needed to operate on a problem. UE 130 may use processors 135-1, 135-2, 135-3, and 135-4 resident on UE 130 (shown in FIG. 1A) and may use a fifth processor located on another device (not shown in FIG. 1A) that may be connected to UE 130 via a link (e.g., hardware based link, such as a wired or wireless link, or a software based link, such as a pointer).

In one implementation, UE 130 may include processors 135-1, 135-2, 135-3, and 135-4 (collectively processors 135). Processors 135 may include hardware and/or software based logic that performs processing operations. Processors 135 may include substantially any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, a biologic processor, etc.

Implementations of UE 130 and client 110 may operate in homogenous configurations where both client 110 and UE 130 are configured in substantially similar ways (e.g., both devices are running the same operating system, technical computing environment, etc.), or UE 130 and client 110 may operate in heterogeneous configurations where client 110 may be configured differently with respect to UE 130. Homogeneous and/or heterogeneous configurations of system 100 may operate in static configurations and/or dynamic configurations.

A static configuration is a configuration where a relationship between a requested operation from client 110 and an activity performed by UE 130 is predetermined prior to UE 130 performing processing activities on behalf of client 110. For example, a static configuration may dictate that fast Fourier transforms (FFTs) are always sent to processor 135-1 while interpolation operations are always performed by processor 135-2. A dynamic configuration may include a configuration where determinations about processing resources on UE 130 are made when UE 130 operates on a task and/or when client 110 sends a request to UE 130. For example, a dynamic configuration may make determinations with respect to processors 135 on the fly based on availability of resources for a given processor when a particular activity needs to be performed on behalf of client 110.

Processors 135 may be made up of a single device/component or may include more than one device/component. For example, processor 135-1 may include a pre-processor that operates with another processor, a GPGPU, etc. Alternatively, processor 135-1 may include a group of processors that operate together and are considered a single processor by UE 130, control logic operating with UE 130, or control logic operating with processor 135-1. Processors 135 may be clocked at the same rate (e.g., using a single master clock) or may be clocked at different rates (e.g., where processor 135-1 uses a first clock rate and another processor uses another clock rate).

Implementations of client 110 and UE 130 can take many forms and/or configurations. For example, FIG. 1B shows one form of client 110 and UE 130.

Figure 1B:
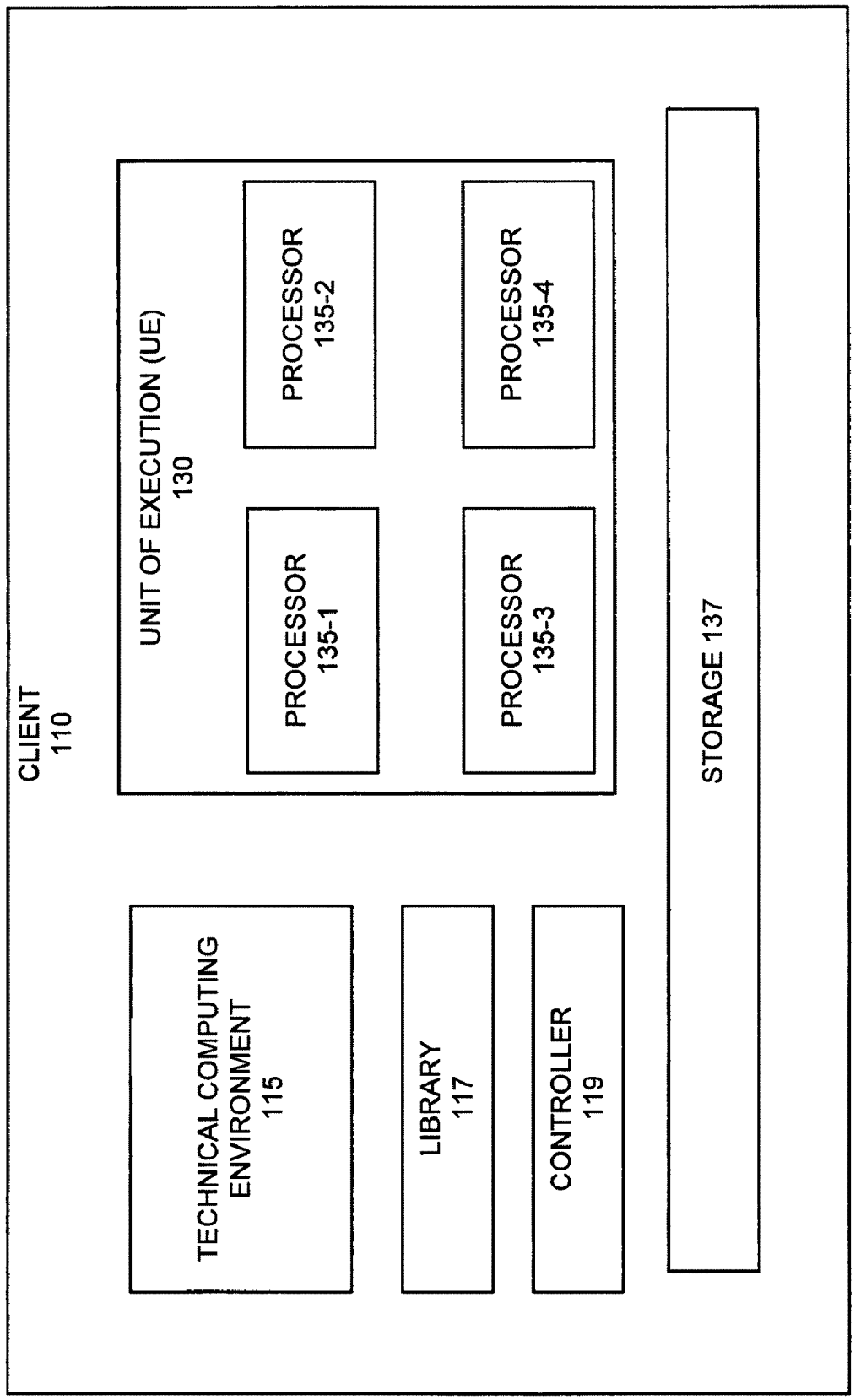
FIG. 1B illustrates an exemplary system that includes a unit of execution operating on a client.

FIG. 1B illustrates an exemplary system that includes UE 130 operating on client 110. Client 110 may include TCE 115, library 117, controller 119, UE 130 that includes processors 135, and storage 137. TCE 115, library 117 controller 119, UE 130 and processors 135 may operate as described in connection with FIG. 1A. In FIG. 1B, UE 130 may be implemented on a board that can be removeably coupled to client 110 to provide client 110 with parallel processing capabilities. Implementations of client 110 may be configured to accommodate substantially any number of boards that can include one or more UE's 130 per board to provide scalable processing capabilities to client 110.

Storage 137 may include hardware and/or software based logic to store information used by client 110 and/or UE 130. For example, storage 137 may store instructions that are used to parse a problem into portions that can be processed in parallel, data associated with the problem, equations associated with the problem, aggregation instructions that allow processors 135 and/or UE 130 to assemble results into an aggregate result for use by client 110, etc. Storage 137 may reside locally on client 110 or may be remote with respect to client 110 and connected thereto via a link. In one embodiment, storage 137 may be implemented via one or more virtual hard drives. For example, client 110 may not include hard disk storage and may use a link (e.g., a pointer) to a hard disk located on a machine that is remote with respect to client 110 (e.g., a remote device operating on a network).

Figure 1C:
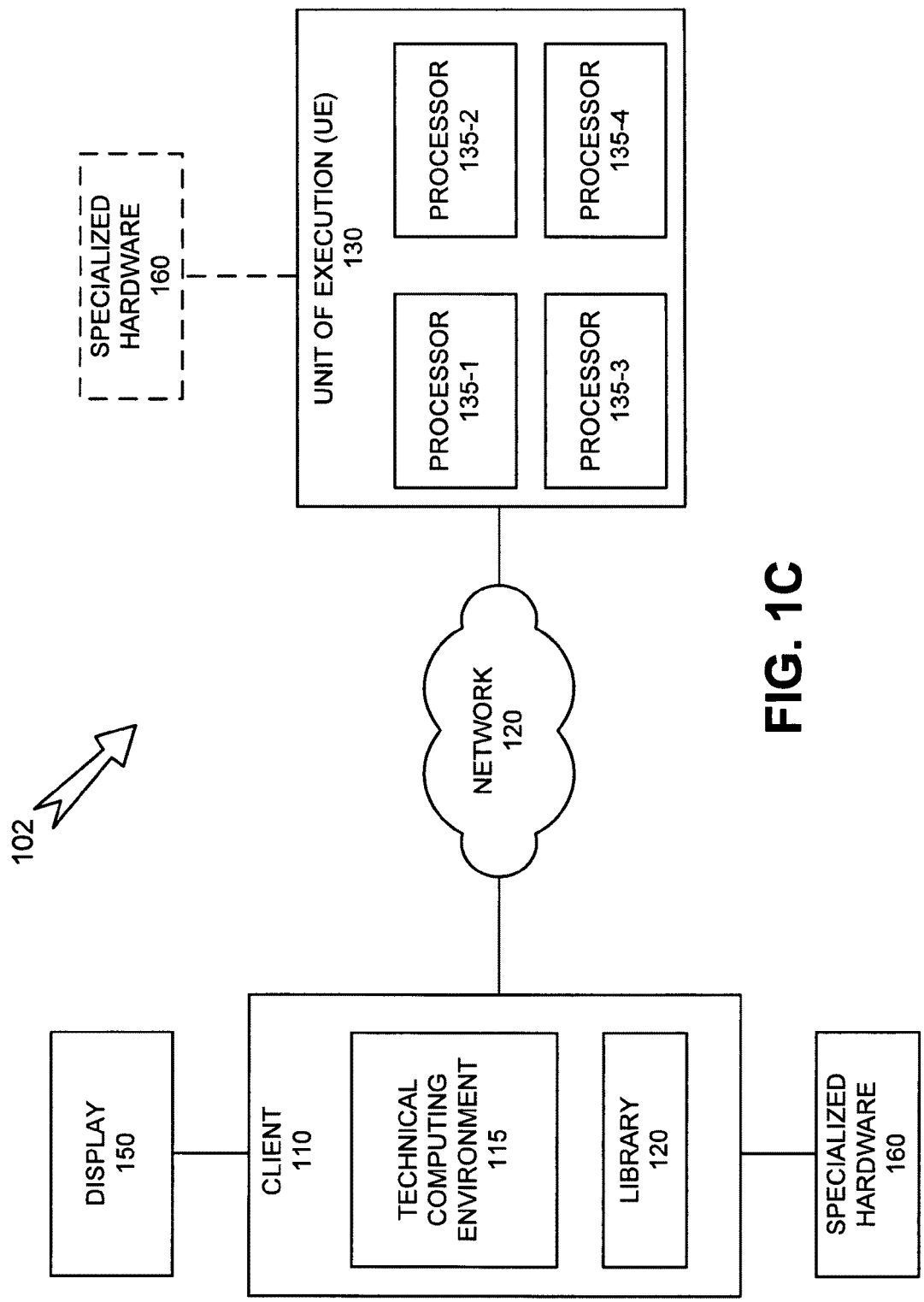
FIG. 1C illustrates an exemplary system that includes a client coupled to a unit of execution via a network.

FIG. 1C illustrates an exemplary system 102 that includes client 110 coupled to UE 130 via network 120. In FIG. 1C client 110 and UE 130 are in a networked configuration where information sent from client 110 may pass through network 120 en route to UE 130. System 102 may include client 110, network 120, UE 130, display 150, and specialized hardware 160. Client 110 and UE 130 may operate as previously described.

Network 120 may include any network capable of transferring data (e.g., packet data or non-packet data). Implementations of network 120 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.11, etc.

Network 120 may include network devices, such as routers, switches, firewalls, and/or servers (not shown). Network 120 may be a hardwired network using wired conductors and/or optical fibers and/or may be a wireless network using free-space optical, radio frequency (RF), and/or acoustic transmission paths. In one implementation, network 120 may be a substantially open public network, such as the Internet. In another implementation, network 120 may be a more restricted network, such as a corporate virtual network. Implementations of networks and/or devices operating on networks described herein are not limited to any particular data type, protocol, architecture/configuration, etc.

Display 150 may include a device that can render information to a user, such as a user of client 110. Display 150 may include a cathode ray tube (CRT) device, a liquid crystal display (LCD) device, a plasma display device, a projection based display device (digital light projection (DLP)), etc. Display 150 may display text and/or graphics to a user based on instructions associated with client 110, UE 130, or another device, such as another device on network 120 (not shown in FIG. 1C).

Specialized hardware 160 may include a device that performs operations on behalf of another device, such as client 110 and/or UE 130. For example, specialized hardware 160 may include a device that generates code for a target device, that interfaces to another device or network (e.g., a transceiver), that performs operations that are not performed by another device in system 102 (e.g., a graphics processor for use with display 150), that stores information (e.g., a redundant array of independent disks (RAID)), etc. Specialized hardware 160 may be associated with client 110 or, optionally, with UE 130 (shown via a broken line). Specialized hardware 160 may include hardware that is scarce with respect to other types of hardware in system 102. Hardware may be scarce because of cost, unique features associated with the hardware, scarcity of components used on the hardware, etc.

Implementations, such as the one shown in FIG. 1C, may use resources that are associated with one device in system 102 but that are not associated with another device in system 102. For example, client 110 may send a problem to UE 130 for parallel processing. The problem may include instructions for displaying a result via a display device. UE 130 may begin to operate on the problem and may determine that it does not have display device with which to display the result. UE 130 may send a display request to client 110, where the request causes information to be displayed on a display device attached to client 110. In another embodiment, UE 130 may inform client 110 that UE 130 does not have a display (e.g., by sending a bi-directional message to client 110), and UE 130 may request the use of display 150 on client 110.

Implementations, such at the one in FIG. 1C, may allow UE 130 to interact directly with devices on client 110, such as display 150 and/or specialized hardware 160, or implementations may allow UE 130 to make requests to client 110, where client 110 interacts with display 150 and/or specialized hardware 160 on behalf of UE 130.

Figure 1D:
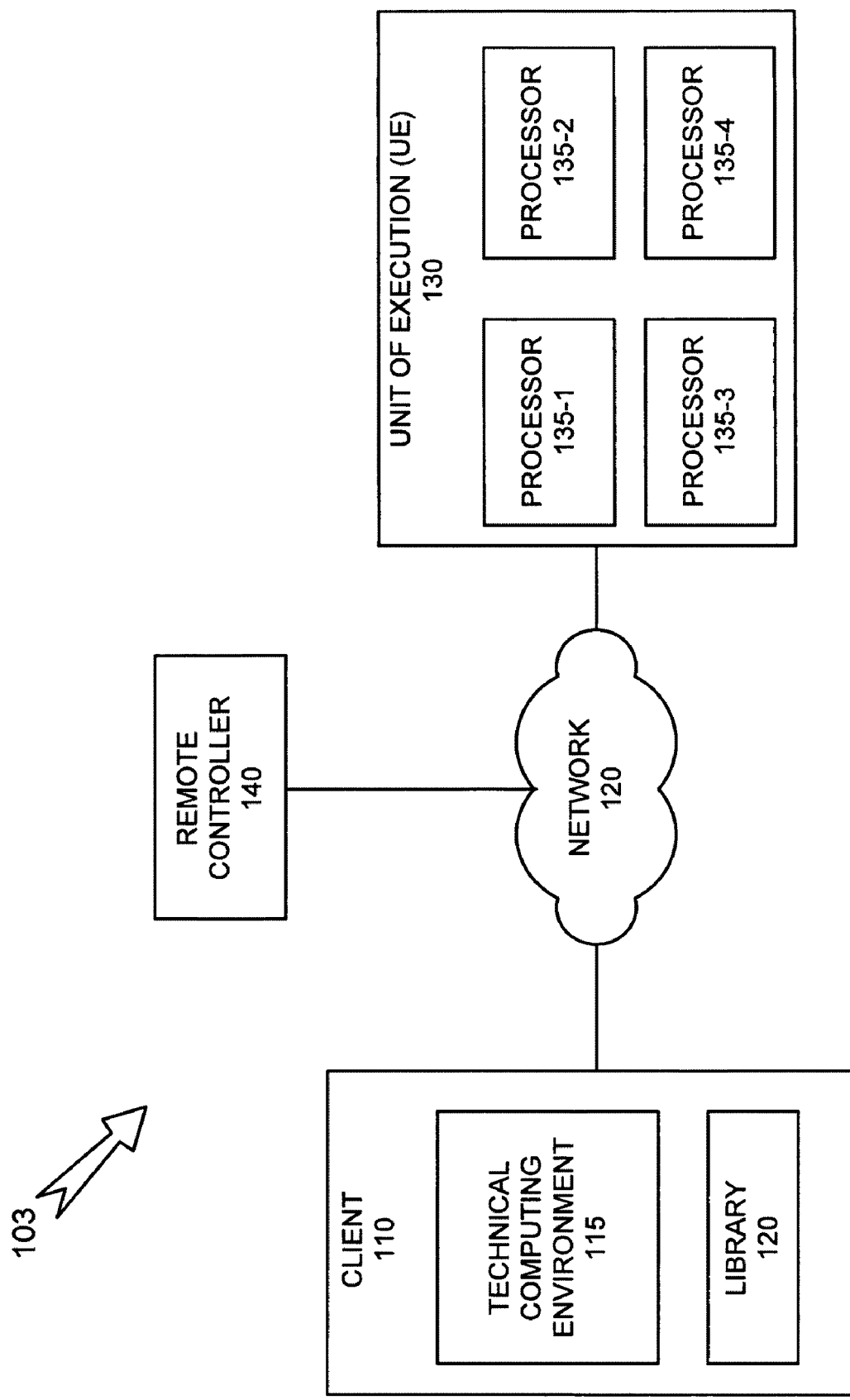
FIG. 1D illustrates an exemplary system that includes a remote controller operating with a client and a unit of execution.

FIG. 1D illustrates an exemplary system 103 that includes a remote controller 140 operating with client 110 and UE 130. Client 110, network 120, and UE 130 may operate as previously described herein. Remote controller 140 may include a device running hardware or software based logic to control operations of a device on network 120. For example, remote controller 140 may be a device that manages parallel processing activities on behalf of another device, such as client 110.

In one implementation, client 110 may send a request to remote controller 140, where the request is for parallel processing. Remote controller 140 may maintain a database that identifies parallel processing resources, such as one or more UE's 130 on network 120, and/or that identifies which parallel processing resources are available at a particular time. Remote controller 140 may forward the request from client 110 to UE 130, and UE 130 may perform parallel processing for client 110. UE 130 may send a result to remote controller 140 and remote controller 140 may forward the result to client 110, or UE 130 may send the result directly to client 110.

Figure 1E:
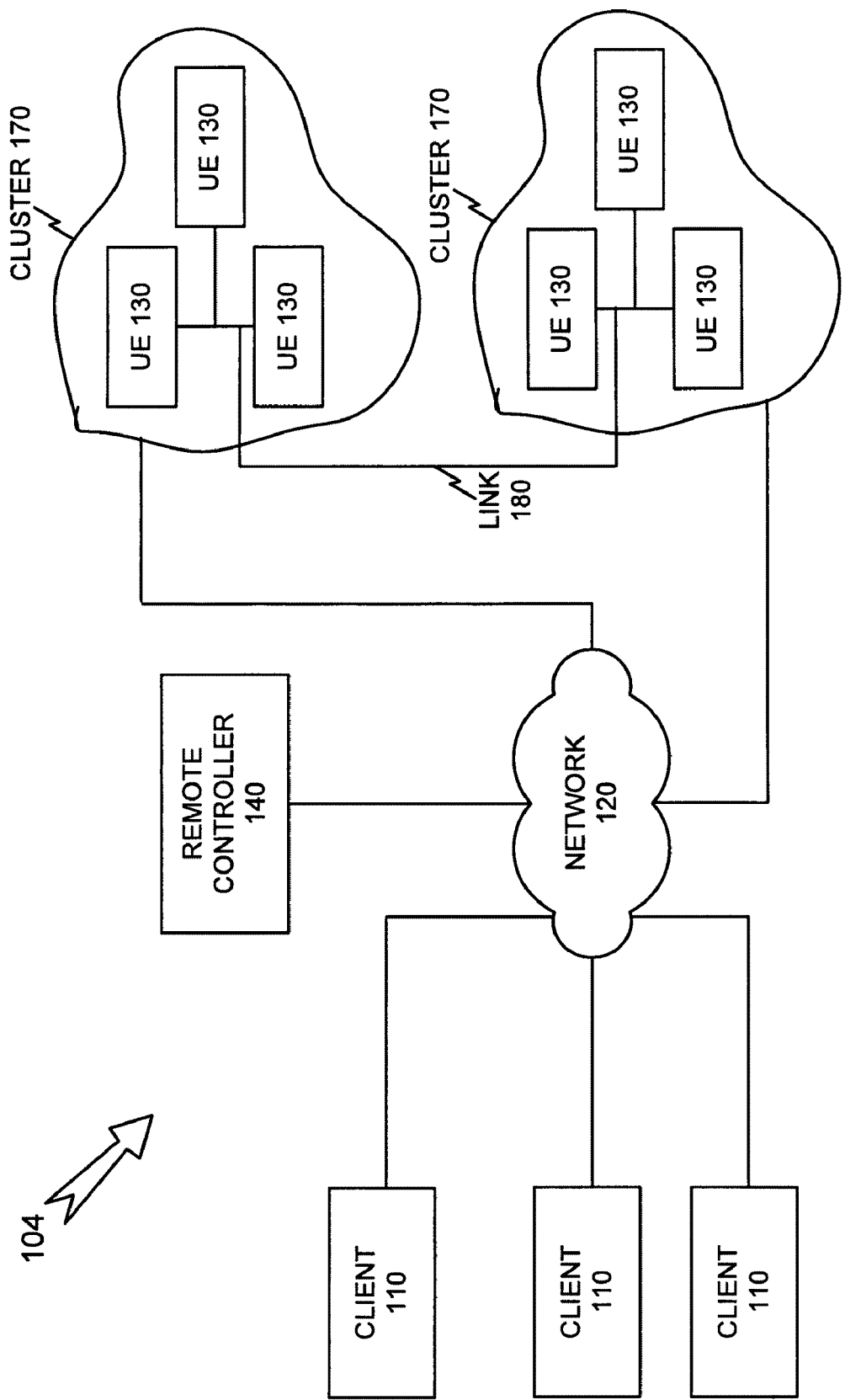
FIG. 1E illustrates an exemplary system that includes clusters and multiple clients.

FIG. 1E illustrates an exemplary system 104 that includes multiple clients 110 and UE's 130 that are arranged in clusters 170. UE's 130 may be arranged in a number of configurations, one of which is a cluster 170. A cluster 170 is a group of devices that may cooperatively operate to perform an operation. For example, a cluster 170 may include a number of UE's 130 that can operate in parallel to solve a problem. Therefore, a cluster 170 may provide significant parallel processing power, as compared to processing power available in a single UE 130 or on a single processor 135. System 104 may further include a number of clients 110. Clients 110 can be arranged in a cluster or other arrangement depending requirements associated with a particular application. One or more clients 110 can access one or more clusters 170 using remote controller 140 or directly without using remote controller 140.

Clusters 170 may be used for dedicated types of processing (e.g., task specific processing) and/or may be used for general processing activities. For example, an implementation that uses task specific clusters 170 may include a first cluster that is used to perform signal processing computations and a second cluster that is used to perform image processing computations. In contrast an implementation that uses general purpose clusters 170 may send a first portion of a problem to a first cluster and may send the remaining portion of the problem to a second cluster regardless of the types of processing required for the first portion or the second portion of the problem. Other implementations may use a combination of task specific clusters 170 and general purpose clusters that can be pre-configured (e.g., a static configuration) or dynamically configured.

Figure 1F:
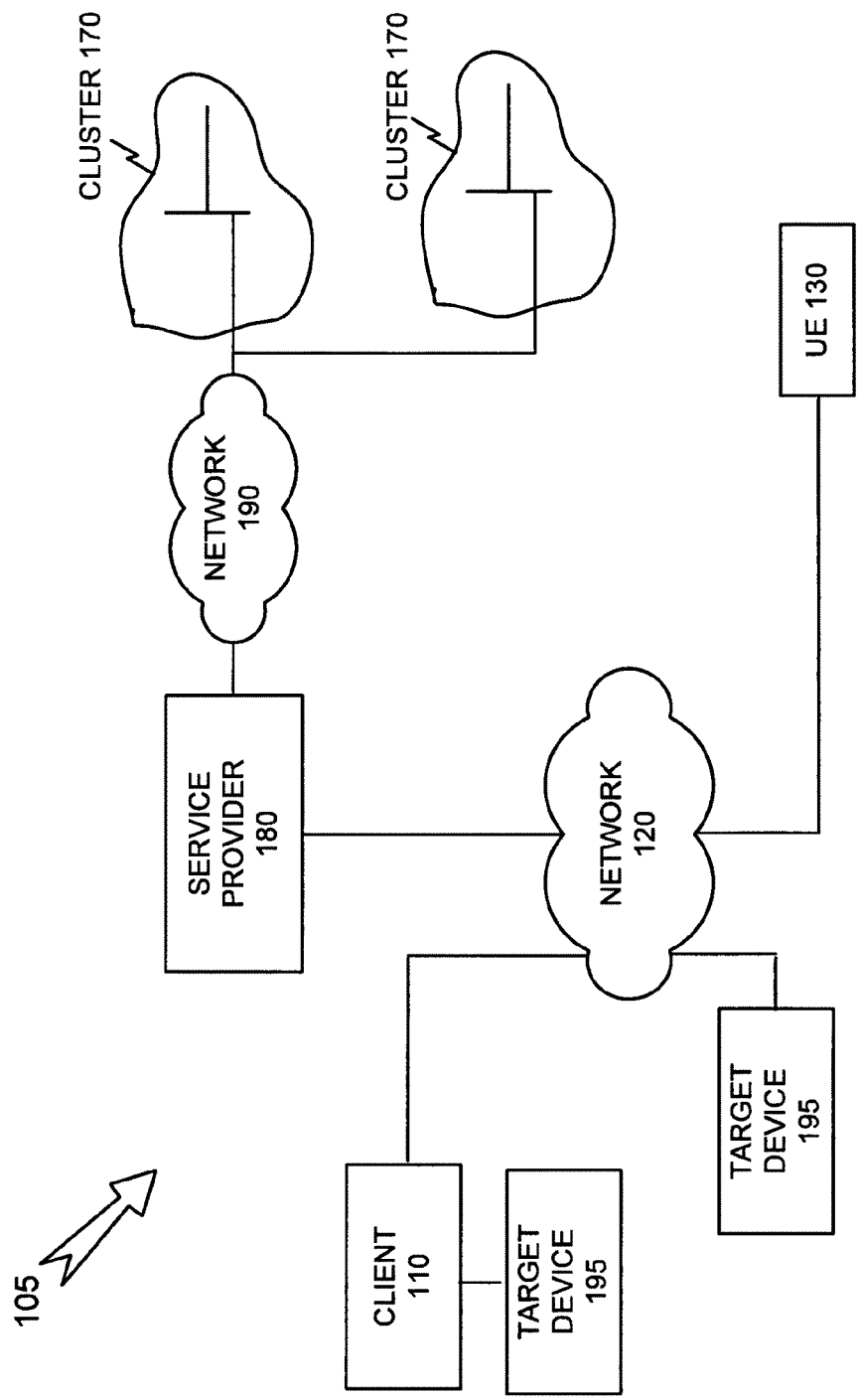
FIG. 1F illustrates an exemplary system that includes a service provider, a client, and a number of units of execution.

FIG. 1F illustrates an exemplary system 105 that includes a service provider 180, a client 110, a UE 130, and a number of clusters 170. In one embodiment, system 105 may include client 110, network 120, UE 130, clusters 170, service provider 180, network 190, and target device 195. Client 110, network 120, UE 130 and cluster 170 may operate as described hereinabove.

Service provider 180 may include logic that makes a service available to another device. For example, service provider 180 may include a server operated by an entity (e.g., an individual, a corporation, an educational institution, a government agency, etc.) that provides one or more services to a destination. Services may include instructions that are executed by a destination or on behalf of a destination to allow the destination to perform an operation or to perform an operation on behalf of the destination.

Assume, for sake of example, that a telecommunications provider operates a web server that provides one or more web-based services to a destination. The web-based services may allow a destination (e.g., a computer operated by a customer) to perform parallel processing using UE's 130 that are operated by the telecommunications provider. For example, the customer may be allowed to use clusters 170 to perform parallel processing when the customer subscribes to the offered web service. Service provider 180 may maintain a database that includes parameters, such as parameters that indicate the status of UE's 130, clusters 170, etc. Service provider 180 may perform a look-up operation in the database when a request for parallel processing is received from the customer. Service provider 180 may connect the customer to parallel processing resources that are available based on parameters in the database.

In one implementation, the customer may receive services on a subscription basis. A subscription may include substantially any type of arrangement, such as monthly subscription, a per-use fee, a fee based on an amount of information exchanged between the provider and the customer, a fee based on a number of processor cycles used by the customer, a fee based on a number of processors 135, UE's 130, clusters 170, etc., used by the customer, etc.

Network 190 may include a network that transfers data. In one embodiment, network 190 may be similar to network 120. Network 190 may be operated by service provider 180 and may allow service provider 180 to interact with one or more clusters 170. For example, service provider 180 may operate a farm of clusters 170 to perform subscription based parallel processing for customers, such as customers associated with client 110. Customers may maintain accounts with service provider 180 and may access clusters 170 via network 190 according to terms, conditions, permissions, etc., associated with the accounts. Network 190 may be a secure or unsecure private network operated by service provider 180. Customers may access clusters 170 via network 190 using passwords, secure channels (e.g., tunnels), and/or via other techniques.

Target device 195 may include a device connected to a network or to another device. In one embodiment, target device 195 may include a device that receives code (e.g., software, instructions, results, etc.) from a device, such as client 110, UE's 130, clusters 170, service provider 180, etc. Target device 195 may be an end user device that receives a result produced by parallel processing activities. Target device 195 may operate on the result and may perform an operation on behalf of itself or on behalf of another device using the result. Target devices 195 may include controllers, processing devices, systems, applications, etc.

Exemplary Functional Diagram

Figure 2:
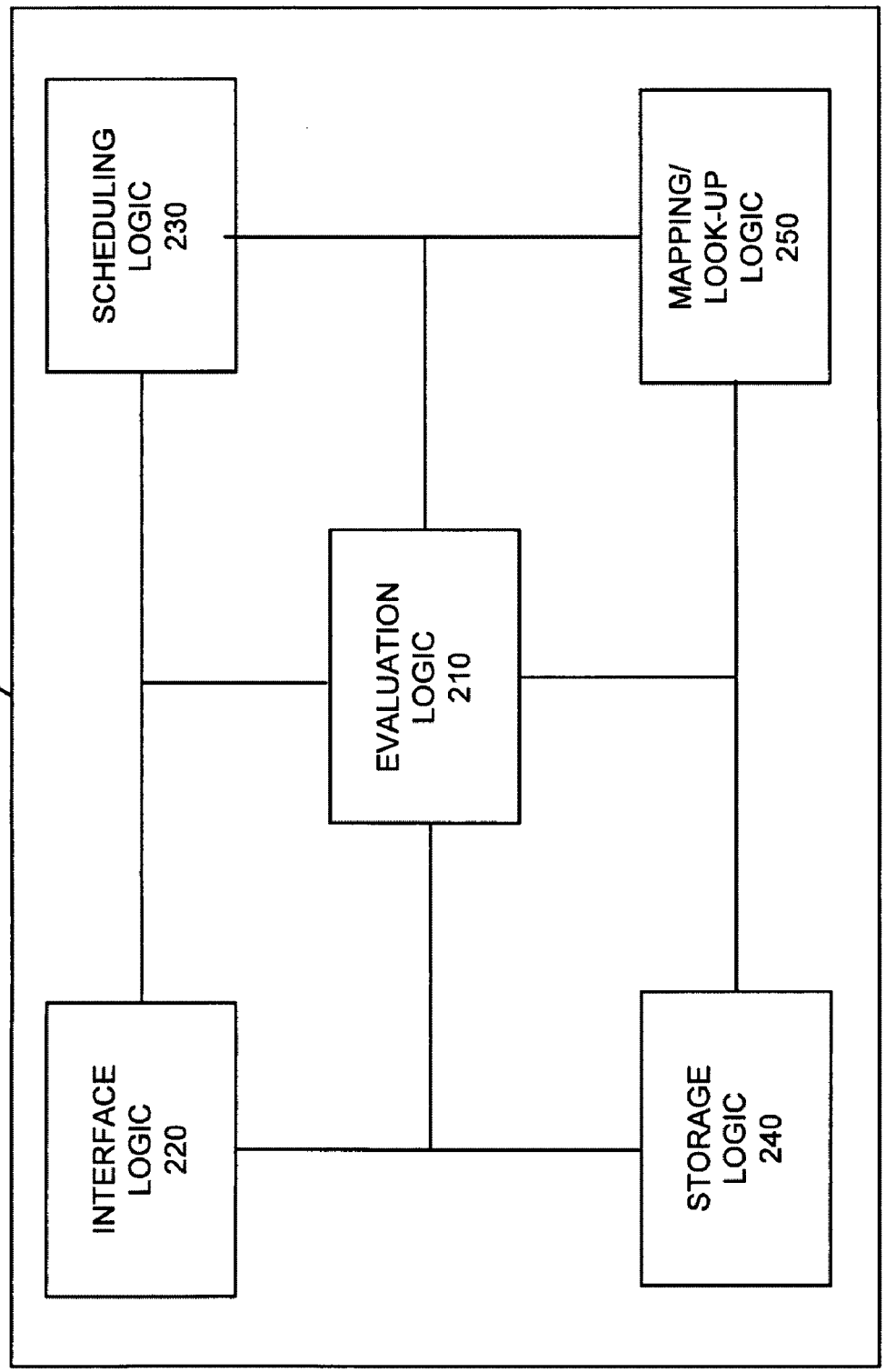
FIG. 2 illustrates an exemplary functional diagram showing logic that can be used to implement parallel processing in an exemplary embodiment.

FIG. 2 illustrates an exemplary functional diagram showing logic that can be used to support parallel processing in an exemplary embodiment. Components in FIG. 2 can reside on a single device, such as client 110, UE 130, remote controller 140, or service provider 180, or the components of FIG. 2 can be parallel across multiple devices. Moreover, the components of FIG. 2 can be implemented in hardware based logic, software based logic, a combination of hardware and software based logic (e.g., hybrid logic, wetware, etc.). The implementation of FIG. 2 is exemplary, and client 110, UE 130, remote controller 140, service provider 180, and/or other devices may include more or fewer functional components without departing from the spirit of the invention.

Evaluation logic 210 may include logic to process instructions or data related to activities. For example, evaluation logic 210 may parse a problem into a number of portions that can be used to facilitate parallel processing of the problem, combine results into a single result, perform arithmetic operations, etc. Evaluation logic 210 may further process instructions, reports, data, etc., on behalf of a device hosting evaluation logic 210 or on behalf of another device (e.g., a remote device).

Interface logic 220 may send information to or may receive information from another device, component, object (e.g., a software object), etc. In one implementation, interface logic 220 may include a code-based interface (e.g., an application program interface (API)), and in another implementation, may include a hardware interface, such as a network interface card (NIC).

Scheduling logic 230 may coordinate activities of devices, components, objects, etc., on client 110, UE 130, remote controller 140, or service provider 180, etc. For example, scheduling logic 230 may maintain a list of available resources that can be used for parallel processing (e.g., processors 135). Scheduling logic 230 may send information to a determined number of available resources so that the resources can perform parallel processing activities using the information. For example, scheduling logic 230 may determine that four processors are required to perform a simulation on behalf of client 110. Scheduling logic 230 may then determine that processors 135-1, 135-2, 135-3 and 135-4 are available (e.g., these processors may be idle). Scheduling logic 230 may send the simulation to processors 135-1, 135-2, 135-3 and 135-4, or scheduling logic 230 may schedule another device, such as interface logic 220, to send the simulation to processors 135-1, 135-2, 135-3 and 135-4.

Scheduling logic 230 may receive results from processors 135 and may forward the results to a destination, such as a requesting device. Alternatively, scheduling logic 230 may instruct processors 135 to send the results directly to the requesting device. Scheduling logic 230 may determine when processors 135-1, 135-2, 135-3 and 135-4 are finished processing and may send other information, such as another simulation, a mathematical problem, etc., to processors 135-1, 135-2, 135-3 and 135-4 when they become available.

Storage logic 240 may store information related to client 110, UE 130 or remote controller 140. In one exemplary embodiment, storage logic 240 may store instructions, equations, functions, data, communication protocols, availability information for devices (e.g., processors 135), etc.

Mapping/lookup-logic 250 may perform mapping/look-up activities on behalf of a device, component, object, etc. For example, processors 135 may be operating on a problem that will cause each processor to generate a message during the processing. For example, each processor may be configured to generate a status message when it is half-way through its portion of the problem. Since each processor may generate substantially the same message, it may be advantageous to avoid sending four similar (or identical) messages to a destination, such as client 110. Mapping/look-up logic 250 may fold the four messages into a single message which is sent to a destination, thereby decreasing the number of messages sent to the destination. Mapping/look-up logic 250 may also receive a single request, instruction, value, etc., and may map the request, instruction, value, etc., to a number of messages for use by a number of devices, such as processors 135.

Mapping/look-up logic 250 may also perform other activities. For example, in one implementation, UE 130 may send a value to client 110 instead of an instruction. Client 110 may receive the value via interface logic 220 and may pass the value to mapping/look-up logic 250 where the value is matched to an instruction using a database, such as a database stored in storage logic 240. When mapping/look-up logic 250 has looked up the instruction that is associated with the value, client 110 may process the instruction.

Implementations of client 110, UE 130, remote scheduler 140, service provider 180, and/or other devices may include other types of logic. For example, implementations may use display logic to display information to a user, security logic to implement and/or administer security features, accounting logic to track charges associated with parallel processing activities, etc.

Exemplary Device Architecture

Figure 3:
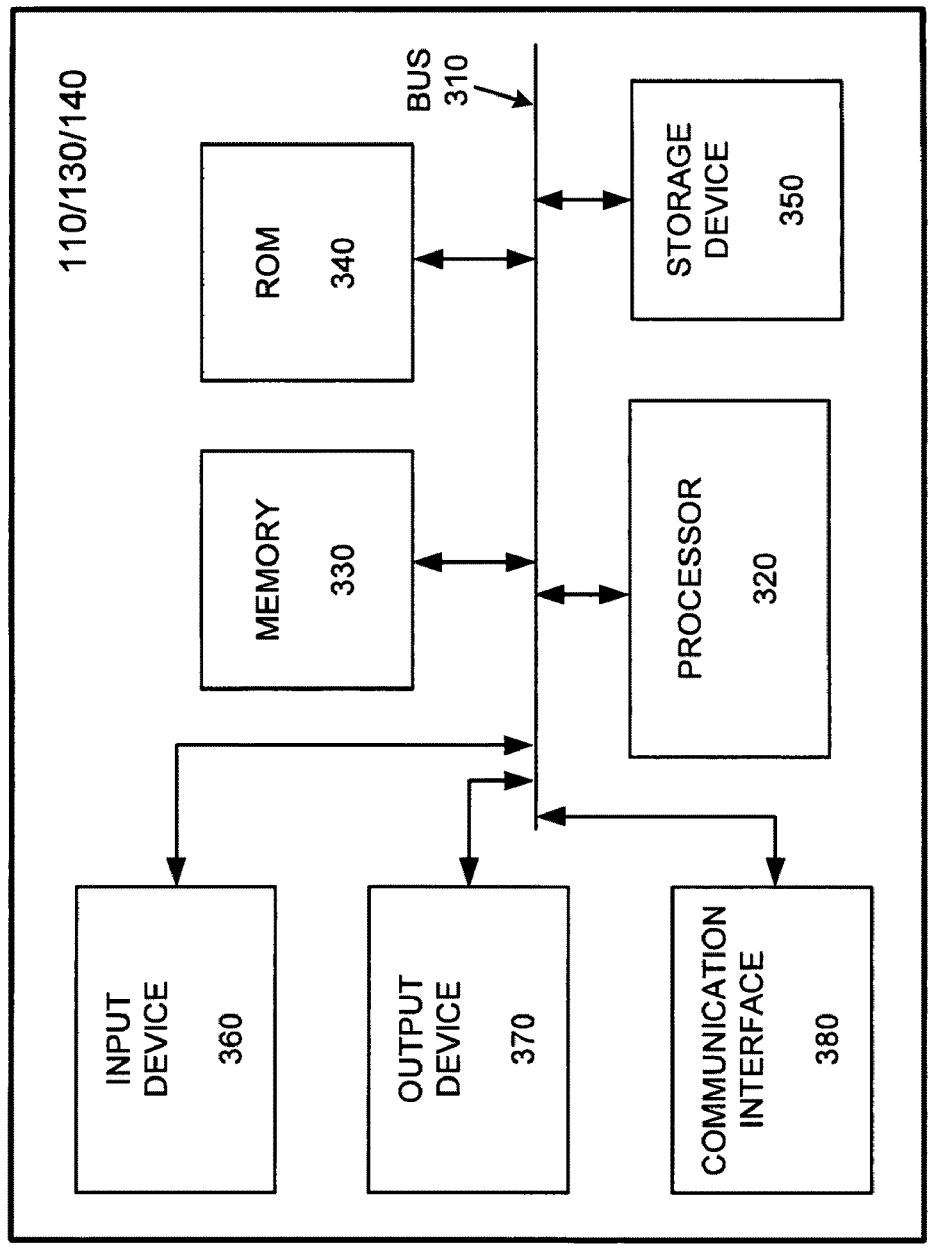
FIG. 3 illustrates an exemplary architecture for implementing the client or the unit of execution of FIGS. 1A-F.

FIG. 3 illustrates an exemplary architecture for implementing client 110. It will be appreciated that UE 130, remote scheduler 140, service provider 180, and/or other devices that can be used with system 100, 102, or 103, 104, 105 may be similarly configured. As illustrated in FIG. 3, client 110 may include a bus 310, a processor 320, a memory 330, a read only memory (ROM) 340, a storage device 350, an input device 360, an output device 370, and a communication interface 380.

Bus 310 may include one or more interconnects that permit communication among the components of client 110. Processor 320 may include any type of processor, microprocessor, or processing logic that may interpret and execute instructions (e.g., an FPGA). Processor 320 may include a single device (e.g., a single core) and/or a group of devices (e.g., multicore). Memory 330 may include a random access memory (RAM) or another type of dynamic storage device that may store information and instructions for execution by processor 320. Memory 330 may also be used to store temporary variables or other intermediate information during execution of instructions by processor 320.

ROM 340 may include a ROM device and/or another type of static storage device that may store static information and instructions for processor 320. Storage device 350 may include a magnetic disk and/or optical disk and its corresponding drive for storing information and/or instructions.

Input device 360 may include any mechanism or combination of mechanisms that permit an operator to input information to client 110, such as a keyboard, a mouse, a touch sensitive display device, a microphone, a pen-based pointing device, and/or a biometric input device, such as a voice recognition device and/or a finger print scanning device. Output device 370 may include any mechanism or combination of mechanisms that outputs information to the operator, including a display, a printer, a speaker, etc.

Communication interface 380 may include any transceiver-like mechanism that enables client 110 to communicate with other devices and/or systems, such as client 110, UE 130, remote controller 140, service provider 180, etc. For example, communication interface 380 may include one or more interfaces, such as a first interface coupled to network 120 and/or a second interface coupled to another device, such as remote controller 140. Alternatively, communication interface 380 may include other mechanisms (e.g., a wireless interface) for communicating via a network, such as a wireless network. In one implementation, communication interface 380 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Client 110 may perform certain functions in response to processor 320 executing software instructions contained in a computer-readable medium, such as memory 330. A computer-readable medium may be defined as one or more memory devices. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Messaging

FIG. 4A illustrates an exemplary timing diagram showing an exchange of messages between client 110 and UE 130 according to an exemplary embodiment.

FIG. 4A illustrates two exemplary communication exchanges, 401 and 402, between client 110 and UE 130. These communication exchanges are exemplary and other types of communication exchanges can be used. For example, alternative communication exchanges can include more messages, different messages, and/or messages in orders that differ from those of FIG. 4A.

In exemplary communication exchange 401, client 110 may send a request 405 to UE 130. For example, request 405 may include data (e.g., a variable), code for an algorithm, simulation code, etc., and request 405 may operate to request parallel processing resources from UE 130. UE 130 may operate on request 405 and may return a message, such as result 410. Result 410 may include a solution to a problem, data to be displayed on display 150, code to be run on specialized hardware 160 or target device 195, etc.

In exemplary communication exchange 402, client 110 may send request 405 to UE 130. UE 130 may operate on request 405 and may send a query 415 to client 110 based on the processing. Query 415 may be a message that operates as a request. For example, UE 130 may generate query 415 to request a missing resource or to request access to a resource on client 110 (e.g., such as access to available memory on client 110, a request for one or more variables stored in a workspace on client 110, etc). Resources that may be needed by UE 130 but that may not be present on UE 130 may include, but are not limited to, variables, functions, algorithms, data, memory, operating system components (e.g., files, extensions, etc.), etc. Other implementations of query 415 may include other types of information, (e.g., a request for a password or other type of permission that may be required before UE 130 can perform a task on behalf of client 110, etc.). Query 415 may allow UE 130 to make requests on demand during processing activities performed on behalf of client 110. For example, UE 130 may send query 415 anytime a variable is needed during processing.

Client 110 may process query 415 and may generate answer 420. Answer 420 may include information that addresses query 415. For example, answer 420 may be a message that includes a password, an authorization to allow UE 130 to perform a task, a file, a variable, a function, a script, data, an address, etc. UE 130 may process answer 420 and may perform parallel processing on behalf of client 110 based on information in answer 420 and/or request 405. UE 130 may generate result 410 based on the processing and may send result 410 to client 110.

Implementations, such as the one illustrated in FIG. 4A, may allow UE 130 to send additional queries 417 to client 110 and may allow client 110 to send additional answers 422 (shown by dashed lines). Exemplary implementations may use substantially any number of queries 415/417 and or answers 420/422.

Figure 4B:
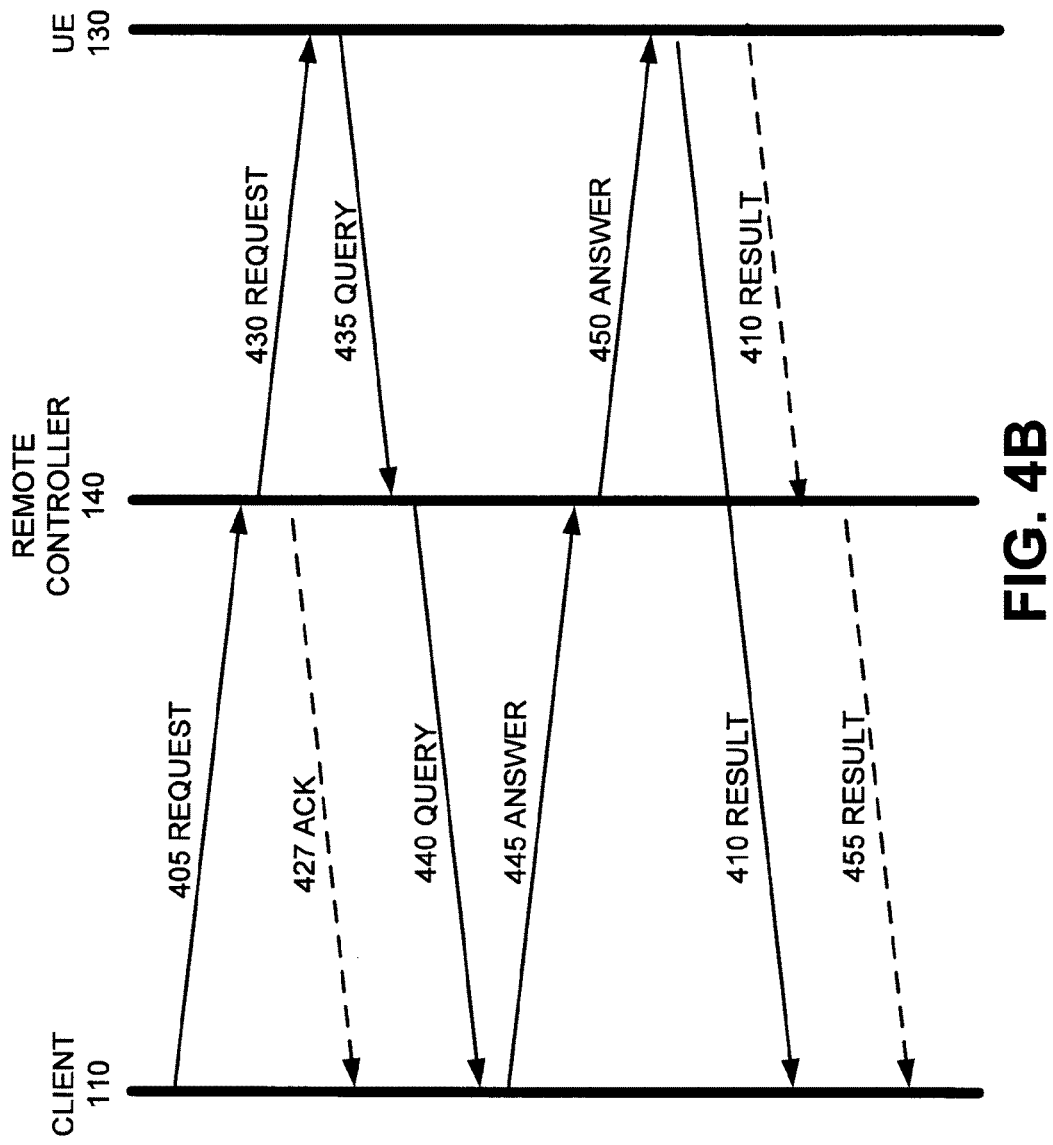
FIG. 4B illustrates an exemplary timing diagram showing an exchange of messages between a client, a remote controller and a unit of execution according to an exemplary embodiment.

FIG. 4B illustrates an exemplary timing diagram showing an exchange of messages between a client 110, UE 130, and remote controller 140 according to an exemplary embodiment. Client 110 may send request 405 to remote controller 140 instead of directly to UE 130 (as shown in FIG. 4A). Remote controller 140 may process request 405 and may send an acknowledgement 427 to client 110 to inform client 110 that request 405 was received and understood.

Remote controller 140 may forward request 405 to UE 130 as request 430. In one implementation, remote controller 140 may convert request 405 from an incoming format into an outgoing format compatible with UE 130. Request 430 may be in the outgoing format. In another implementation, remote controller 140 may forward request 405 to UE 130 as request 430 without performing any conversion actions on request 405.

UE 130 may process request 430 and may generate query 435 to request information from a device, such as remote controller 140, client 110, etc. In one implementation, remote controller 140 may respond to query 435 without sending a message to another device (e.g., client 110). In another implementation, remote controller 140 may forward query 435 to another device (e.g., client 110) as query 440. Remote controller 140 may or may not convert query 435 from an incoming format to an outgoing format before sending query 440 to client 110.

Client 110 may process query 440 and may generate an answer 445. For example, query 435 may request a password that allows UE 130 to access sensitive data required for a simulation performed on behalf of client 110. Client 110 may send the password to UE 130 via answer 445. In one implementation, client 110 may send answer 445 to remote controller 140, and remote controller 140 may forward answer 450 to UE 130 for processing thereon. In another implementation, client 110 may send answer 445 directly to UE 130 without assistance from remote controller 140.

UE 130 may process answer 450 and/or information in request 430 and may produce result 410. In one implementation, UE 130 may send result 410 directly to client 110 without assistance from remote controller 140. In another implementation, UE 130 may send result 410 to remote controller 140 and remote controller 140 may forward result 410 to client 110 as result 455. In alternative implementations, client 110, remote controller 140, and UE 130 can send and/or receive additional messages.

Exemplary Data Structure

Figure 5A:
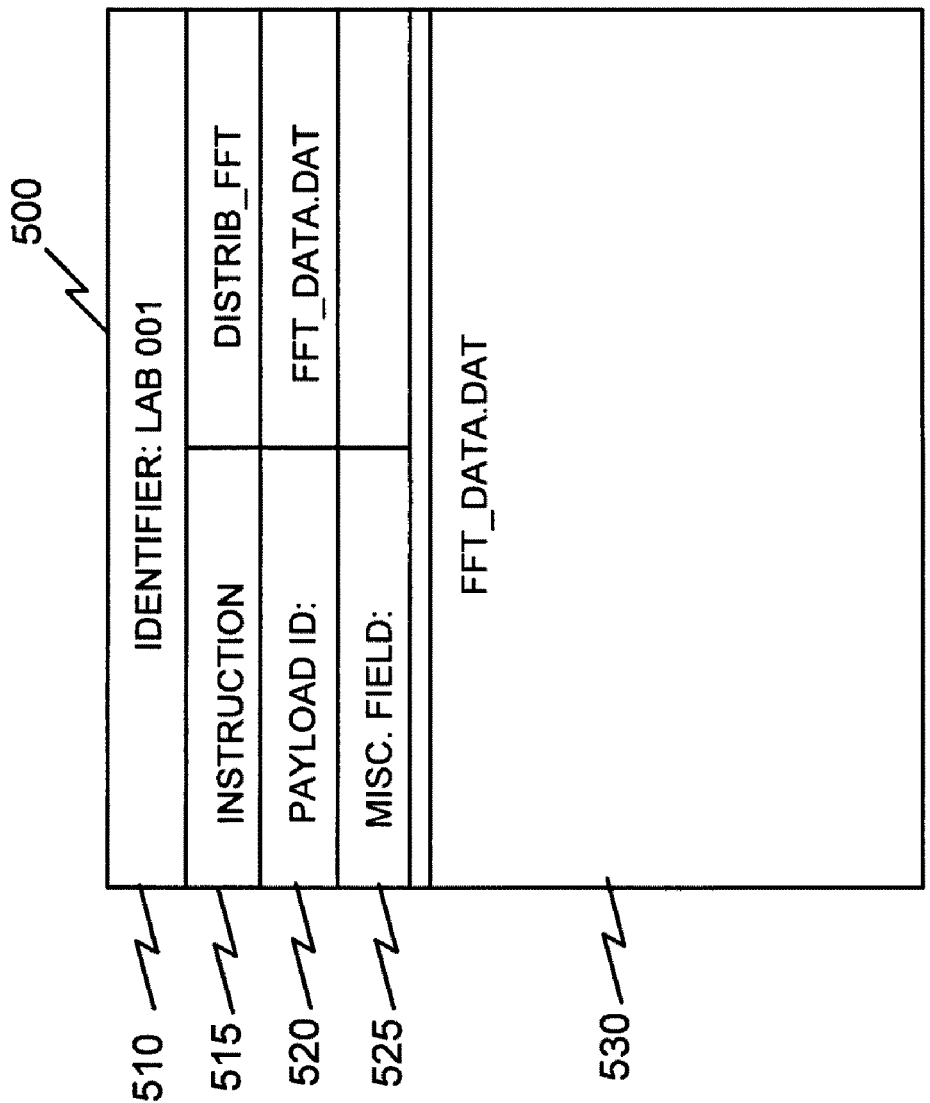
FIG. 5A illustrates an exemplary data structure for storing information associated with a client.

FIG. 5A illustrates an exemplary data structure 500 for storing information associated with client 110. Data structure 500 may be implemented via a computer-readable medium that can be used to store information in a machine-readable format. Exemplary implementations may use substantially any number of data structures 500 to store information associated with client 110. Implementations of data structure 500 may be populated via an operator or a device, such as a device in system 100, 102 or 103, 104, etc.

In one implementation, data structure 500 may include information arranged in a row and column format to facilitate interpretation by users of client 110 and/or by devices, logic (e.g., evaluation logic 210), etc. Other implementations of data structure 500 may be configured in other ways.

Data structure 500 may include identifier 510, instruction 515, payload ID 520, miscellaneous field 525, and payload 530. Identifier 510 may include information that identifies a user or device associated with other information in data structure 500, such as instruction 515 or payload 530. For example, client 110 may store a file that is associated with UE 130. Identifier 510 may include information that uniquely identifies UE 130.

Instruction 515 may include information that identifies an instruction that is associated with a device identified via identifier 510. For example, instruction 515 may include information that identifies a type of processing that a UE 130 will perform on behalf of client 110. In one implementation, instruction 515 may include information that identifies how payload 530 will be divided for parallel processing (e.g., what portion of payload 530 should be processed on a particular processor 135). In another implementation, instruction 515 may include a general instruction and UE 130 may determine how to process the instruction in a parallel manner.

Payload ID 520 may include information that identifies a payload that will be operated on by a device that performs parallel processing on behalf of client 110. For example, a payload may include data that is operated on using a parallel fast Fourier transform (FFT) processing technique. Payload ID 520 may identify where the payload is stored (e.g., an address, a device name, a file name, etc.). In one implementation, the payload may be part of data structure 500 (e.g., the implementation of FIG. 5A) and in another implementation, the payload may be stored remotely with respect to data structure 500 (e.g., data structure 500 is stored in first memory location and payload 530 is stored in a second memory location or on a different storage device).

Miscellaneous field 525 may include information that can be useful for client 110 or other devices, such as UE 130. For example, miscellaneous field 525 may include a password, a time value, a date value, payload size information, error handling information, etc.

Payload 530 may include information that is operated on by client 110, UE 130, or another device. For example, payload 530 may include data or other information that is operated on by processors 135 to produce a result.

Figure 5B:
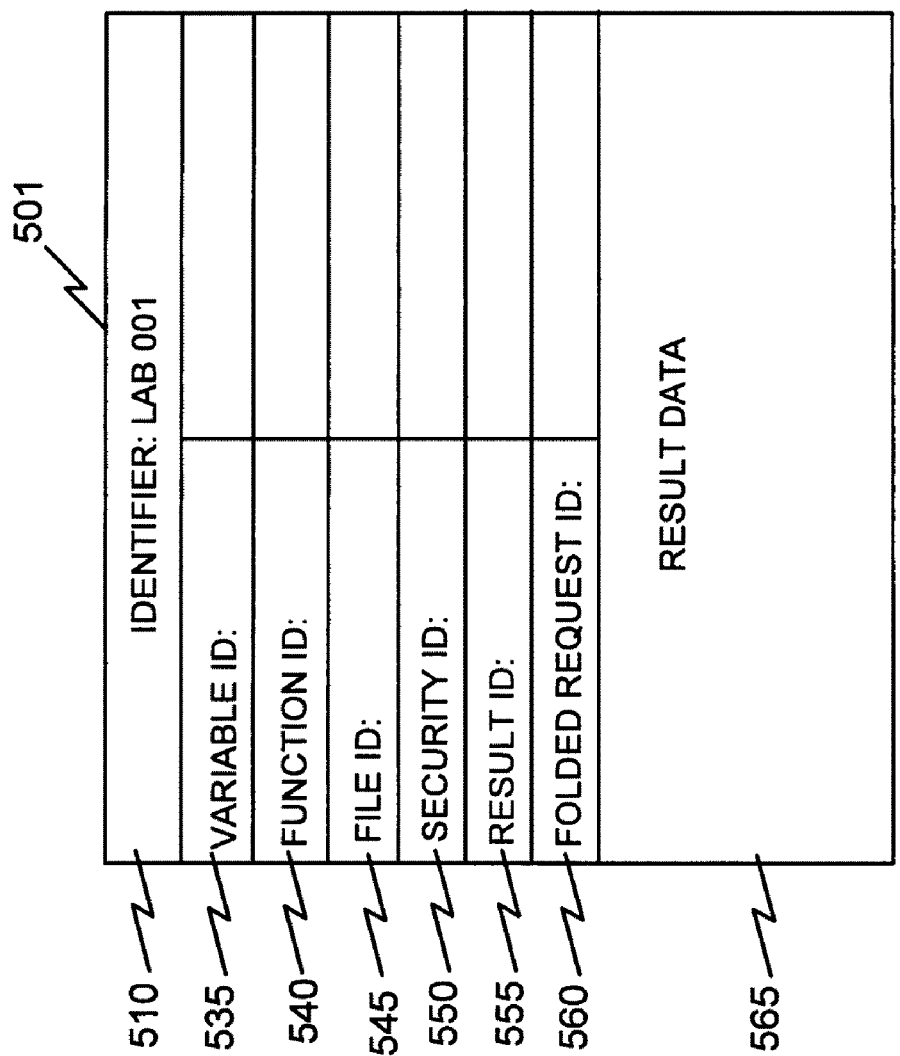
FIG. 5B illustrates an exemplary data structure for storing information associated with a unit of execution.

FIG. 5B illustrates an exemplary data structure 501 for storing information associated with UE 130. Data structure 501 may be similar to data structure 500 in organization and/or in other ways, or data structure 501 may be different than data structure 500. The data structure of FIG. 5B is illustrative and other implementations of data structure 501 may take other forms, may include other types of information, and/or may include information in an arrangement that differs from the arrangement of FIG. 5B.

Data structure 501 may include identifier 510, variable ID 535, function ID 540, file ID 545, security ID 550, result ID 555, folded request ID 560 and result data 565. Identifier 510 may identify a unit of execution, processor, etc., that is associated with data structure 501. Variable ID 535 may include information that identifies a variable used with UE 130 or with another device. For example, in one embodiment, variable ID 535 may include information that identifies a variable that UE 130 needs to complete parallel processing on payload 530 (FIG. 5A). In this embodiment, UE 130 may send data structure 501 to client 110 and client 110 may read information in variable ID 535 to identify one or more variables that are needed by UE 130. Client 110 may send the identified one or more variables to UE 130 so that UE 130 can perform parallel processing on behalf of client 110. In another embodiment, variable ID 535 may identify variables that UE 130 makes available to processors 135 during parallel processing activities.

Function ID 540 may include information that identifies a function associated with UE 130. For example, function ID 540 may identify a function that UE 130 will request from client 110, a function that is stored on UE 130 for use with one or more processors 135, etc.

File ID 545 may include information that identifies a file associated with UE 130. For example, file ID 545 may identify a file that UE 130 will request from client 110, a file stored on UE 130 for use in performing parallel processing activities, etc.

Security ID 550 may include security information associated with UE 130. For example, in one embodiment, security ID 550 may identify a password or other type of authorization mechanism that UE 130 uses to perform parallel processing on behalf of client 110. In another embodiment, security ID 550 may include a request for an authorization mechanism (e.g., a password, digital certificate, watermark, key, token, etc.). For example, UE 130 may send a portion of data structure 501 that includes security ID 550 to another device, such as client 110 or remote controller 140.

Result ID 555 may include information that identifies a result associated with UE 130. For example, UE 130 may perform parallel processing on behalf of client 110 using payload 530. UE 130 may generate a result file that includes one or more results of the parallel processing activities. Result ID 555 may include a file name that identifies a file storing the one or more results. In one embodiment, result ID 555 can refer to a folded result that is made up of two or more other results. A receiving device may process the folded result and may perform an operation based on the processing.

Folded request ID 560 may include information about folded requests associated with UE 130. For example, UE 130 may perform parallel processing using two or more processors. During the processing, the two or more processors may generate similar or identical messages (e.g., requests, status indicators (e.g., flags), error messages, intermediate results, etc.). UE 130 may include logic (e.g., mapping/look-up logic 250) that allows UE 130 to fold the similar and/or identical messages into a single message that can be sent to another device, such as client 110 or remote controller 140. Folded request ID 560 may store the folded message or may store an identifier for the folded message, such as a link, etc. A receiving device, such as client 110, may process the folded message and may use the folded message to access, e.g., look-up other information, etc.

Result data 565 may include one or more results generated by UE 130. Alternatively, result data 565 may include one or more results generated on behalf of UE 130 by another device (e.g., another parallel processing device connected to UE 130 via a network). In one embodiment, result ID 555 may identify result data 565, and result data 565 may be associated with data structure 501, as shown in FIG. 5B, or result data 565 may be located remotely with respect to data structure 501 and referenced via result ID 555 (e.g., via an address, pointer, link, etc.).

Implementations of data structures 500, 501, and/or other data structures compatible with client 110, UE 130, remote controller 140, service provider 180, etc., can be used locally on a device (e.g., stored, read, copied, transferred from one component to another component, etc.) or may be sent from one device to another device over a communication medium (e.g., a wired link, a wireless link, a network, a bus, etc.). Therefore, embodiments of data structures discussed herein are not limited to any particular implementation, device, configuration, etc. For example, some or all of data structures 500 and/or 501 can be used as code-based interfaces (e.g., APIs) to facilitate the exchange of information in exemplary embodiments.

Exemplary Application Program Interface

Figure 6A:
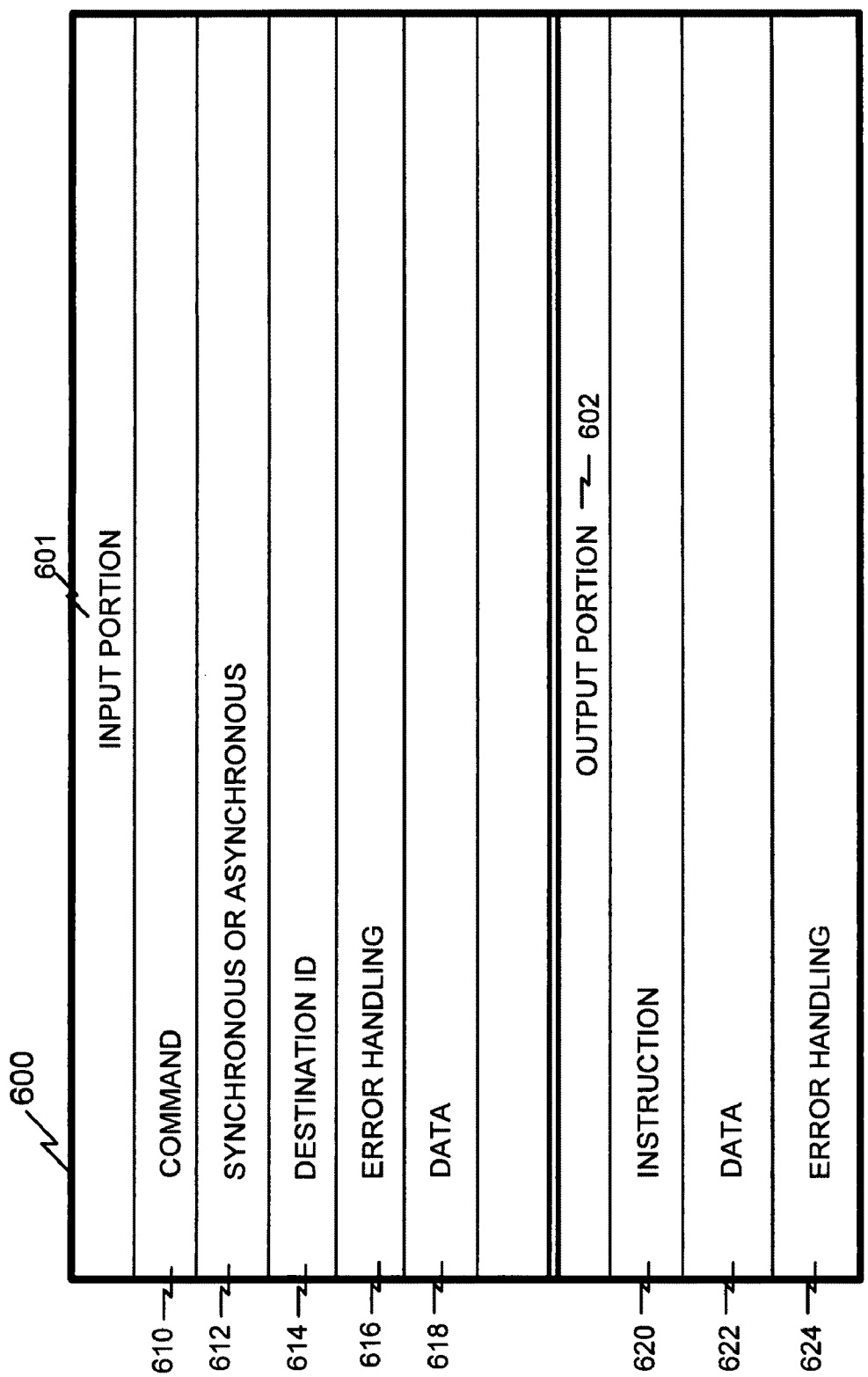
FIG. 6A illustrates an exemplary application program interface that can be used in an exemplary embodiment of a client.

FIG. 6A illustrates an exemplary API 600 that can be used in an exemplary embodiment of client 110. API 600 may be a code-based interface that can be used by systems, devices, objects, etc., to exchange information with another system, device, object, etc. In one embodiment, API 600 may operate on client 110 and may allow client 110 to receive information from and/or send information to UE 130, remote controller 140, service provider 180, etc. Embodiments of API 600 may be adapted for transmission from one device to another, e.g., by appending a header to API 600 to allow API 600 to be sent over network 120 or 190.

API 600 may represent a structured format for distributing information across system 100, 102, 103, 104, 105, etc.

API 600 may include input portion 601 and output portion 602. Input portion 601 may include information that can be used to allow client 110 to receive information (e.g., data, instructions, identifiers, etc.) from another device, object, application, etc. In one embodiment, input portion 601 may include command 610, synchronous or asynchronous 612, destination identifier (ID) 614, error handling 616, and data 618.

Command 610 may include information that identifies a command, instruction, request, return value, etc. For example, command 610 may include the contents of query 415 (FIG. 4A) from UE 130. Synchronous or asynchronous 612 may include information that identifies whether client 110 should process information associated with command 610 in a synchronous or an asynchronous manner.

Destination ID 614 may include information that identifies a device, application, object, etc., that can send information to client 110. For example, destination ID 614 may include information that identifies a device that sends information to client 110 via API 600. In another embodiment, destination ID may include information that identifies a device, application, object, etc., that can receive information from client 110 via an output portion of API 600. For example, destination ID 614 may include information that identifies UE 130, processors 135, clusters 170, etc. Destination ID 614 may include an address, name, port number, socket ID, link, pointer, etc.

Error handling 616 may include information that can be used by client 110 to identify or correct an error, such as an error reported by UE 130 to client 110. Data 618 may include information that identifies data that can be used by client 110 or that constitutes data used by client 110. For example, UE 130 may generate a result that includes data, such as a matrix, when performing parallel processing on behalf of client 110. Data 618 may include the matrix or may include information about the matrix, such as a link, file name, address, etc.

Output portion 602 may include instruction 620, data 622, and error handling 624. Instruction 620 may include information that that is used by a destination (e.g., a device, application, object, etc.) to perform an operation on behalf of client 110. For example, instruction 620 may include information that instructs UE 130 to perform an operation (e.g., performing parallel matrix computations) on behalf of client 110.

Data 622 may include data or may include information that identifies data that can be used by a destination (e.g., UE 130, clusters 170, etc.) to perform an operation on behalf of client 110. For example, data 622 may include the matrix on which parallel processing will be performed by UE 130. Error handling 624 may include information that identifies or reports an error to a destination.

Figure 6B:
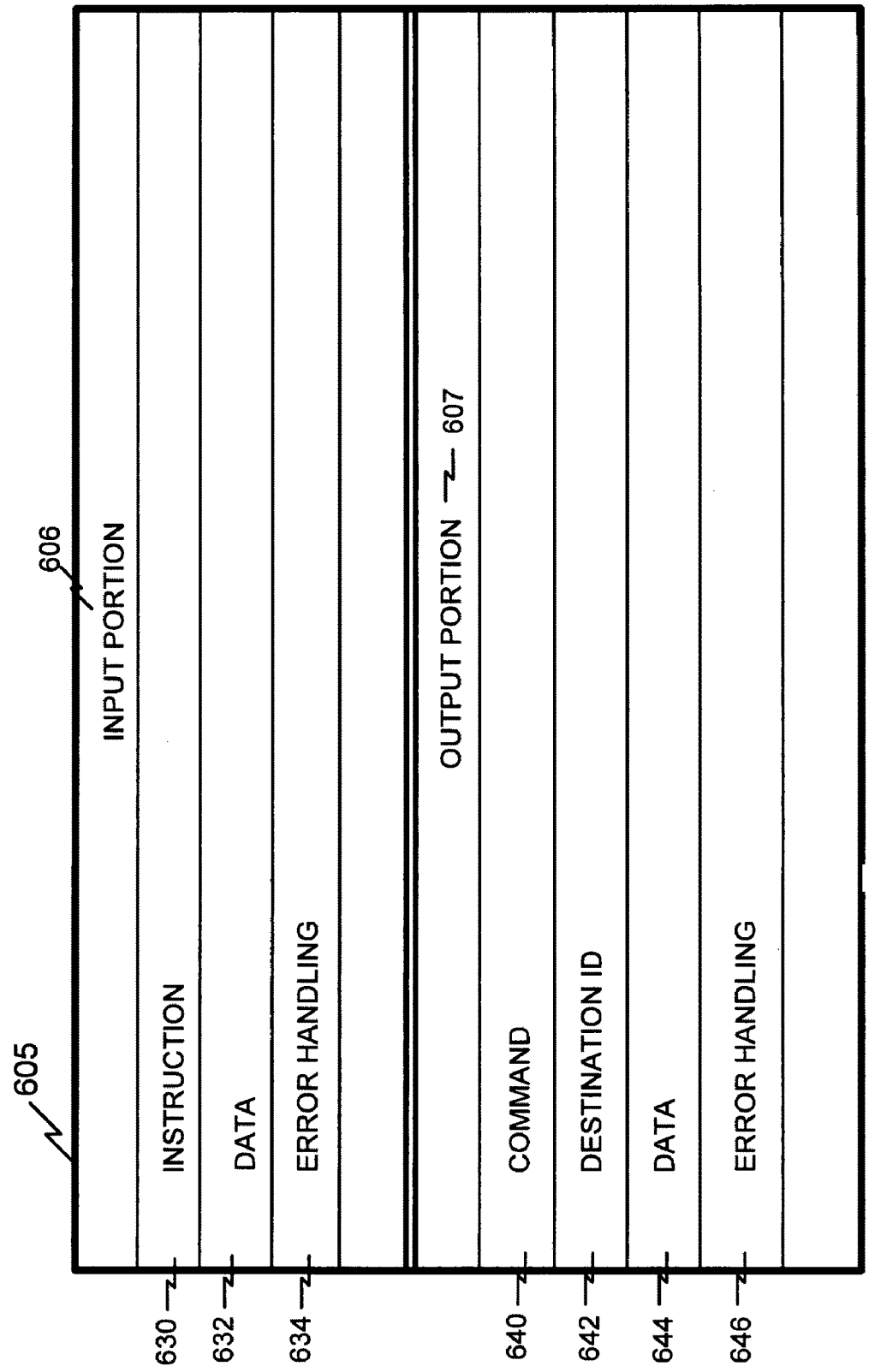
FIG. 6B illustrates an exemplary application program interface that can be used in an exemplary embodiment of a unit of execution.

FIG. 6B illustrates an exemplary application program interface 605 that can be used in an exemplary embodiment of a unit of execution. API 605 may be a code-based interface that can be used by systems, devices, objects, etc., to exchange information with another system, device, object, etc. In one embodiment, API 605 may operate on UE 130 and may allow UE 130 to receive information from and/or send information to client 110, remote controller 140, service provider 180, etc. Embodiments of API 605 may be adapted for transmission from one device to another, e.g., by appending a header to API 605 to allow API 605 to be sent over a network.

API 605 may include an input portion 606 and an output portion 607. Input portion 606 may include information that is received by UE 130 and output portion 607 may include information sent from UE 130 to another device, application, object, etc.

Input portion 606 may include instruction 630, data 632, and error handling 634. Instruction 630 may include one or more executable instructions that are used by UE 130 to perform parallel processing on behalf of another device, such as client 110. Instruction 630 may include an actual instruction, or an identifier for an instruction, e.g., a link, address, etc. In one embodiment the contents of instruction 620 (from API 600 in FIG. 6A) may be in instruction 630.

Data 632 may include information that is operated on by UE 130. Alternatively, data 632 may include an identifier for information that is operated on by UE 130 (e.g., a link, address, etc.). For example, client 110 may send an instruction 620 and data 622 to UE 130 for processing using API 600. UE 130 may receive the instruction via instruction 620 and may receive the data via data 632. UE 130 may operate on the data using the instruction while performing parallel processing on behalf of client 110. Error handling 634 may include information that identifies an error. For example, client 110 may send an error message to UE 130. UE 130 may receive the error message via error handling 634.

Output portion 607 may include command 640, destination ID 642, data 644 and error handling 646. Command 640 may include information that identifies a command sent from UE 130 to another device. For example, UE 130 may perform processing for client 110 and may generate a result that includes a command, such as a plot command. UE 130 may send the command to client 110 via command 640.

Destination ID 642 may include information that identifies a device that will receive information from UE 130. Data 644 may include information produced by UE 130 based on performing parallel processing activities. For example, data 644 may include information making up a result, a link to a file that includes a result, etc. Error handling 646 may include information that identifies an error. For example, UE 130 may have generated an error while performing parallel processing (e.g., UE 130 may not have had enough memory to complete a computation). UE 130 may insert an error message into error handling 646 and may send the error to a device identified by information in destination ID 642.

APIs 600 and 605 are exemplary and exemplary embodiments may include more APIs, fewer APIs, or APIs in configurations that differ from those of FIGS. 6A and 6B. In addition, APIs used with exemplary embodiments may include more fields, fewer fields, or fields arranged in orders that differ from the ordering of fields in FIGS. 6A and 6B.

Exemplary User Interfaces

Figure 7:
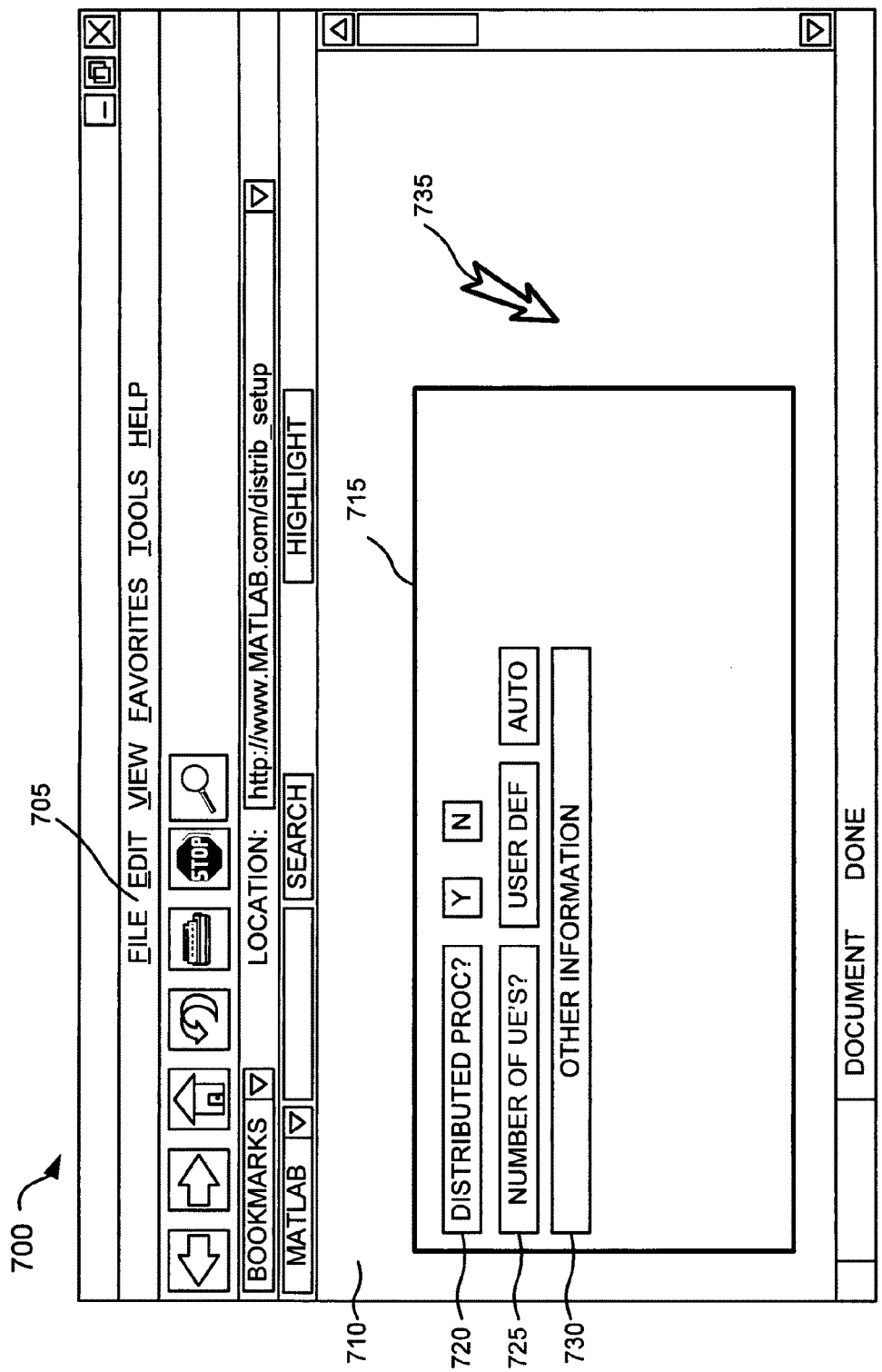
FIG. 7 illustrates an exemplary user interface that can be used to display information to a user in an exemplary embodiment.

FIG. 7 illustrates an exemplary user interface 700 that can be used to display information to a user in an exemplary embodiment. Interface 700 and/or other interfaces described herein may be a graphical user interface (GUI) or a non-graphical user interface, such as a text based interface. User interface 700 and/or other user interfaces described herein may further provide information to users via customized interfaces (e.g., proprietary interfaces) and/or interfaces that are generally known to those of skill in the art (e.g., browser-based interfaces). User interfaces described herein, may receive user inputs via input devices, such as but not limited to, keyboards, pointing devices (e.g., a mouse, stylus, trackball, touchpad, joystick, other types of motion tracking devices, etc.), biometric input devices, touch sensitive displays, microphones, etc. User interfaces described herein may be user configurable (e.g., a user may change the size of the user interface, information displayed in a user interface, color schemes used by the user interface, positions of text, images, icons, windows, etc., in the user interface, etc.) and/or may not be user configurable.

Interface 700 may be displayed to a user via display 150, output device 370, etc., and may include menu 705, display area 710, information window 715, selection field 720, UE's field 725, other information field 730, and cursor 735. Menu 705 may include information associated with menus that are accessed by the user. For example, in one embodiment, menu 705 my identify items, such as File, Edit, View, etc., that can be selected by a user (e.g., via cursor 735) to open one or more drop down menus. Drop down menus may provide the user with substantially any number of items that can be selected by the user to invoke various types of functionality on the user's behalf. For example, selecting File may open a drop down menu that includes Open, Close, Save, Save As, Print, Print Preview, etc. Interface 700 may further include icons that let the user perform actions, such as moving to a previous display, returning to a home display (or page), printing the contents of a portion of interface 700, etc.

Display area 710 may include a portion of interface 700. For example, display area 710 may include a portion of interface 700 that is located below menu 705. Display area 710 may, or may not, be defined by a border (e.g., a boundary).

Information window 715 may include a portion of display area 710 that is used to display information to a user, such as information about UE 130. Information window 715 may display text or graphics to the user. For example, information window 715 may display information about UE 130, a status of a parallel processing task, a text editor that allows the user to modify source code, debugging information that allows the user to diagnose code, a dashboard to show a user the operating status of processors 135, etc. In one embodiment, information window 715 may include selection field 720, UE's field 725, and other information field 730.

Selection field 720 may include information related to a user's selection regarding parallel processing. For example, selection field 720 may allow a user to select whether his/her application should be processed in a parallel manner. In one embodiment, the user may select "yes" to have an application, problem, etc., processed in a parallel manner or "no" to have the application, problem, etc., processed on a single device. In another embodiment, selection field 720 may be omitted and a system, such as client 110, may determine whether parallel processing should be used without obtaining input from the user.

UE's field 725 may include information about a number of UE's that will be used to perform parallel processing on behalf of a user or device. For example, UE's field 725 may allow a user to specify a number of UE's, processors, clusters, grids, etc., that should be used to perform parallel processing on behalf of the user. Alternatively, the user may decide to let a device, such as client 110, UE 130 and/or remote controller 140 determine how many UE's, processors, clusters, grids, etc., should be used to perform parallel processing.

Other information field 730 may include other types of information that can be used with system 100, 102, 103, etc. For example, other information field 730 may include information about a data file that will be processed by UE 130, information about code that will be used to perform parallel processing, information about a drive on which results of parallel processing will be stored, etc.

Cursor 735 may include a mechanism that can be positioned by a user or device to identify information in interface 700. Cursor 735 may be positioned within interface 700 via a pointing device, a spoken command, a keyboard input, etc.

Figure 8:
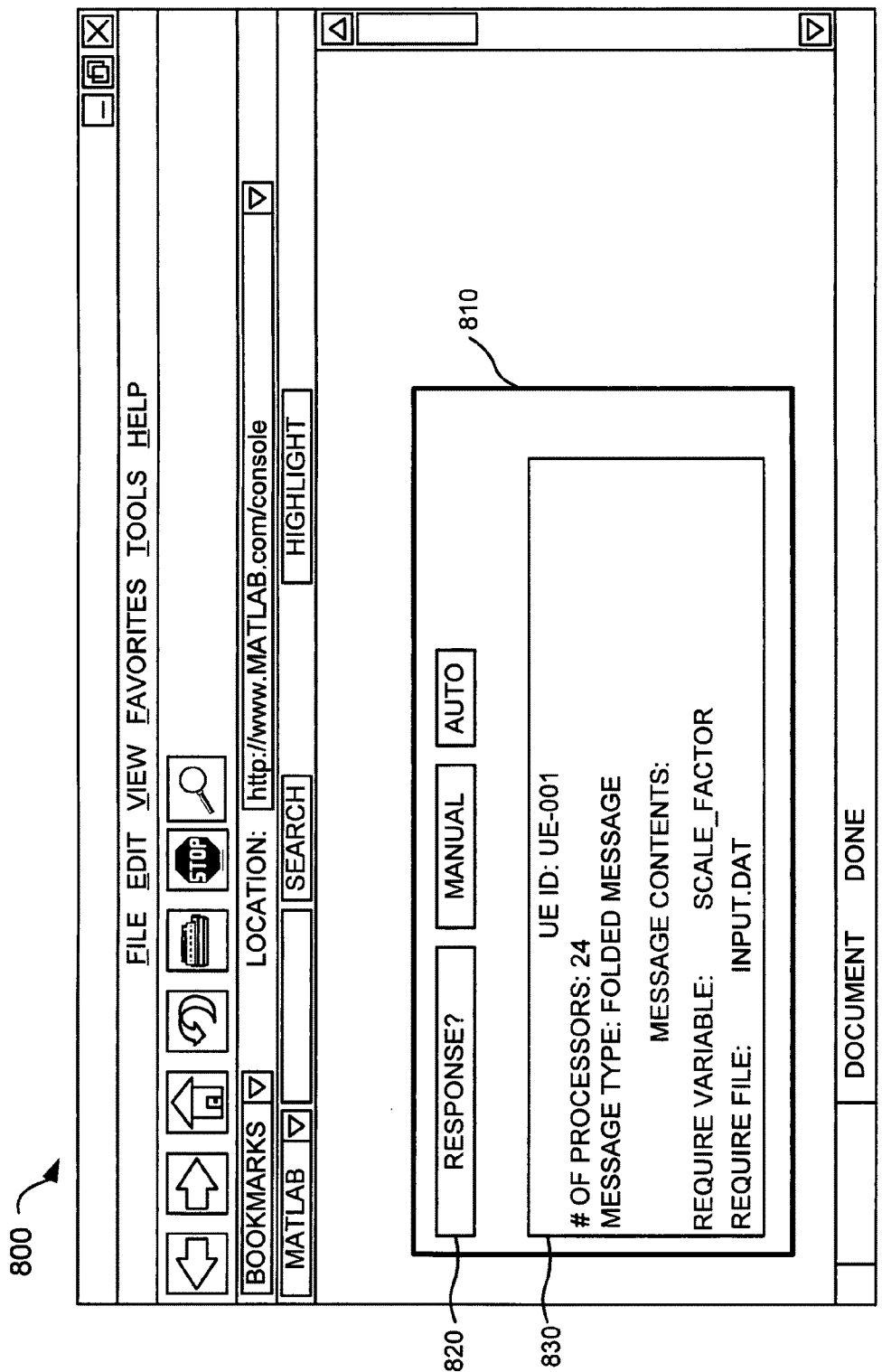
FIG. 8 illustrates an exemplary user interface that can be used to display bi-directional communication information received from a unit of execution.

FIG. 8 illustrates an exemplary user interface 800 that can be used to display bi-directional communication information received from a parallel processing device. In one embodiment, interface 800 may include window 810, response field 820, and message 830.

Window 810 may include a portion of interface 800 in which bi-directional messages may be displayed to a user. For example, window 810 may have a border within which one or more bi-directional messages are displayed. Information displayed in window 810 may be interactive in that a user may respond to displayed information, may edit displayed information, etc. In one embodiment, window 810 may be a pop-up dialog window that opens on display 150 when a message is received at client 110 from UE 130. In one embodiment, window 810 may include response field 820 and message 830.

Response field 820 may include information that identifies how bi-directional messages should be responded to. For example, response field 820 may allow a user to specify that bi-directional messages received from UE 130 should be manually responded to by the user or should be automatically responded to by client 110. Selecting manual in response field 820 may require that a user acknowledge messages received from UE 130 before parallel processing can continue. For example, UE 130 may send a message to client 110 requesting a variable. A user may have to respond to the message by typing in a name or other information about the variable before UE 130 can continue parallel processing. In contrast, client 110 may automatically provide the variable name or other information to UE 130 without requiring user interaction when "auto" is selected in response filed 820.

Message 830 may include information received from UE 130 and/or another device that performs parallel processing activities. In one embodiment, message 830 may include information that identifies a device that sent the message, e.g., UE 001, information about a number of processors operating on a task associated with client 110, or a user thereof, information identifying a type of message (e.g., information indicating that a message is a folded message that includes information related to two or more other messages (e.g., two or more un-folded messages)). Message 830 may further include information, such as message contents, about items that are needed by parallel processing devices, such as variable names, file names, constants, permissions, additional memory, etc.

Figure 9:
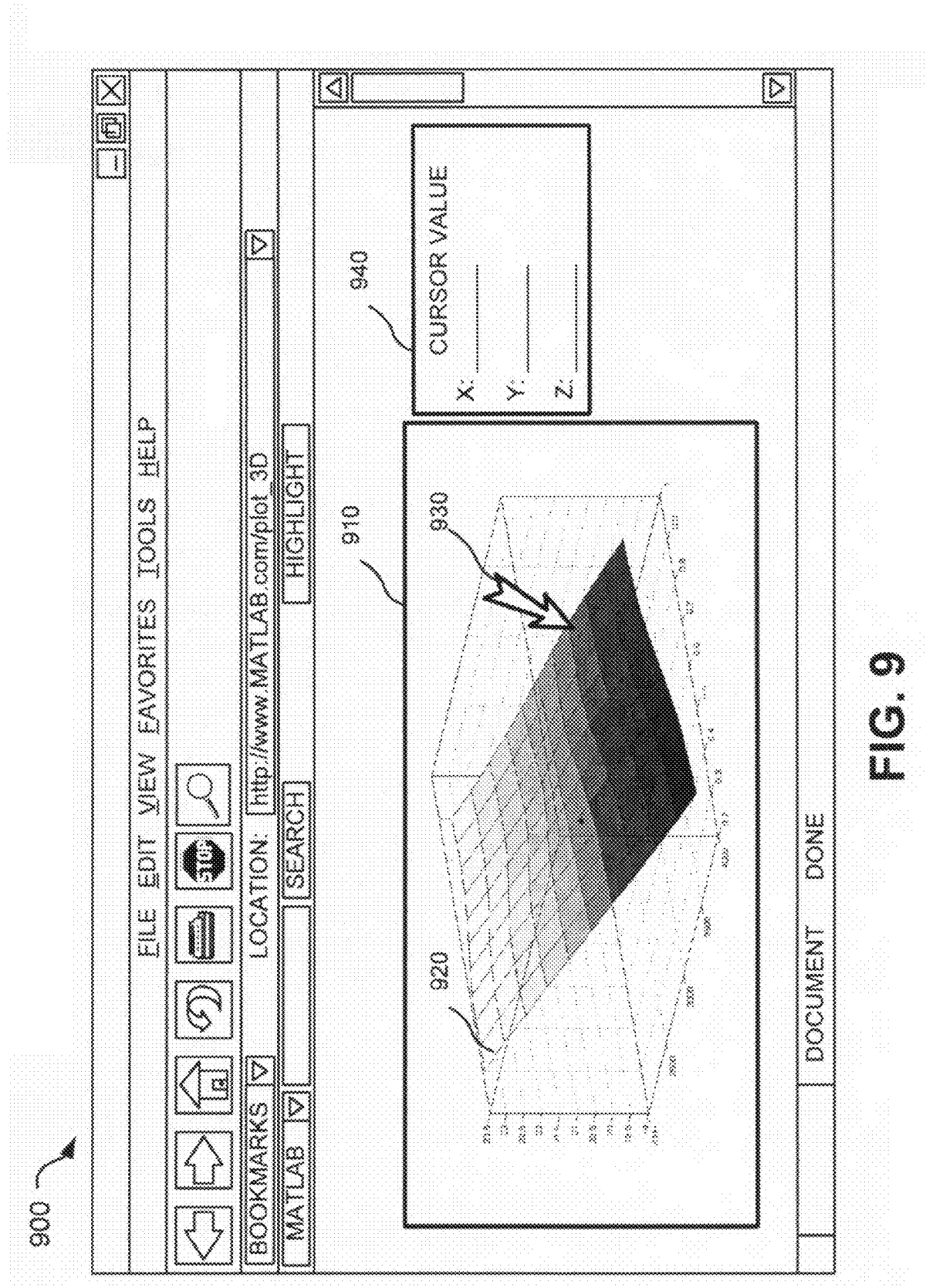
FIG. 9 illustrates an exemplary user interface that can be used to display a result that is received at a client device from a unit of execution.

FIG. 9 illustrates an exemplary user interface 900 that can be used to display a result that is received client 110 from a parallel processing device, such as UE 130. Interface 900 may display textual and/or graphical results to a user. For example, interface 900 may include window 910, plot 920, cursor 930 and cursor value 940.

Window 910 may include a portion of interface 900 that is used to display a result to a user. For example, client 110 may send a problem to UE 130, and UE 130 may perform parallel processing on the problem using processors 134. UE 130 may receive results from processors 135 and may assimilate the results into a final, or aggregate, result. UE 130 may send the result to client 110 and client 110 may display the result to a user via window 910. In one implementation, window 910 may include a three dimensional plot 920 of a surface. A user may move cursor 930 over the surface and cursor window 940 may display information related to the position of cursor 930. For example, cursor window 940 may display x, y, and z coordinates that are related to the position of cursor 930. Embodiments of interface 900 may provide allow a user to interact with results displayed in window 910.

Exemplary Processing

Figure 10:
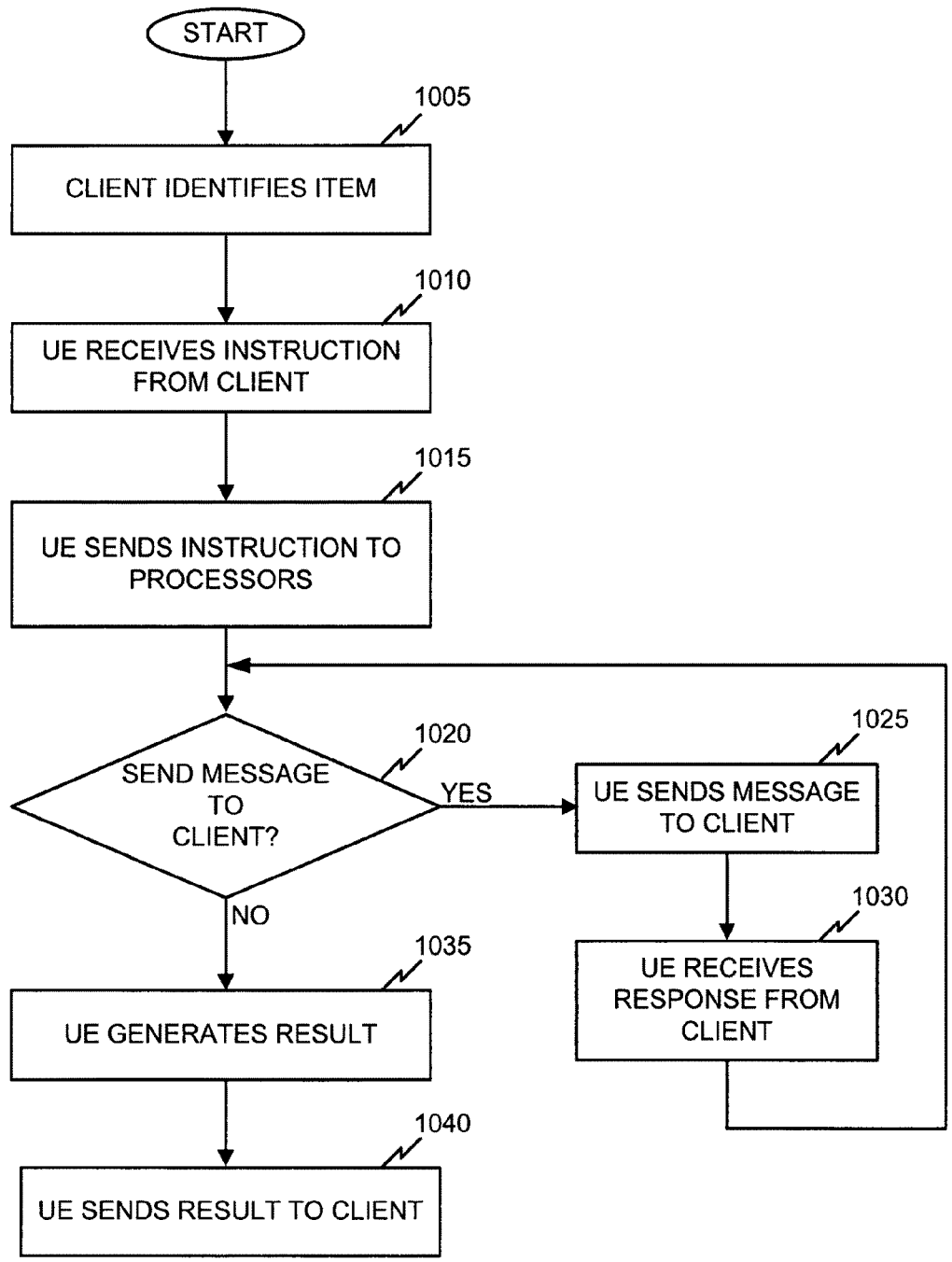
FIG. 10 illustrates a flow chart showing exemplary processing that can be used with an exemplary embodiment.

FIG. 10 illustrates a flow chart showing exemplary processing that can be used with an exemplary embodiment. The acts discussed in connection with FIG. 10 are illustrative. Other implementations may include more acts, fewer acts, or acts illustrated in FIG. 10 in an order that differs from the ordering shown in FIG. 10. Client 110 may identify an item that can be processed using more than one processing device (act 1005). For example, client 110 may identify a model that can benefit from being run in a parallel environment, such as by being run on a number of processors operating in parallel. In one embodiment, client 110 may determine that UE 130 can run the model in parallel. In another embodiment, client 110 may send the problem or a request to remote controller 140 or service provider 180 and remote controller 140 or service provider 180 may determine whether parallel processing should be performed.

UE 130 may receive an instruction from client 110 (act 1010). For example, UE 130 may receive an instruction that identifies the model and that may include data for the model. In one embodiment, client 110 may send the instruction to UE 130 using data structure 500 (FIG. 5A) and/or API 600. UE 130 may evaluate the instruction and may investigate to determine whether adequate resources are available on UE 130 to perform the parallel processing. In one embodiment, UE 130 may operate with other devices, such as remote controller 140 and/or other UE's/clusters to obtain resources when UE 130 does not have adequate resources residing thereon.

UE 130 may process the instruction alone or may obtain assistance from other devices to process the instruction. For example, client 110 may assist UE 130 with processing the instruction, such as by providing a password, a variable, a file, etc., to UE 130. In one implementation, UE 130 may ask client 110 if UE 130 can proceed with running the model after UE 130 make an initial determination with respect to resources required to run the model.

UE 130 may send information related to the instruction to processors 135 (act 1015). For example, UE 130 may have four processors that operate in parallel, such as processors 135-1, 135-2, 135-3, and 135-4. UE 130 may divide the model into four portions and may send one portion to each available processor.

UE 130 may determine whether it needs to send a message to client 110 (act 1020). For example, processors 135 may begin running the model using the data received from client 110. While running the model, one or more processors 135 may determine that it needs additional data, where the additional data resides on client 110. UE 130 may send a message to client 110 requesting the additional data (act 1025). The message may cause a pop-up dialog window to open on display 150. For example, window 810 may be displayed on display 150. A user of client 110 may need to interact with the pop-up window in order for client 110 to respond to the message. Client 110 may process the message and may retrieve the requested data from storage logic 240 and/or storage device 350. For example, the user may need to click "OK" via a pointing device to allow client 110 to retrieve the data.

UE 130 may receive the requested data from client 110 via a response (act 1030). UE 130 may make the data available to processors 135 so that processors 135 can continue running the model. When UE 130 determines that it does not have to send a message to client 110 (act 1020), processors 135 may continue running the model. Processors 135 may each generate a portion of a final result and may provide the respective portions to UE 130. UE 130 may assemble the portions into a final result (1035).

UE 130 may send the final result to client 110 (act 1040). In one embodiment, UE 130 may send the result to client 110 via data structure 501 and/or API 605. Client 110 may process data structure 501 and may extract the result therefrom. Client 110 may, or may not, perform additional processing on the result. Client 110 may store the result in a file, make the result available to a user via display 150, print the result, make the result available to another software application running on client 110, make the result available to another device, such as specialized hardware 160, etc.

In one embodiment, UE 130 may return a value to client 110 instead of an instruction and/or result. In another embodiment, UE 130 may send a command, such as a plot command, to client 110 along with a data set, where the plot command and the data set make up the result. Client 110 may display the data via user interface 900 in response to the plot command.

For example, client 110 may operate as a dumb terminal when UE 130 sends a plot command and a data set to client 110.

Exemplary Alternative Embodiments

Many alternative embodiments are possible based on the foregoing description. For example, a first alternative embodiment may include a client 110 that includes a configuration (e.g., an operating system) that is vastly different from a configuration on UE 130. Client 110 may send a parallel processing request to UE 130 along with data to be processed. UE 130 may determine that its configuration is so different from the configuration of client 110 that UE 130 cannot perform the requested operation on the data. UE 130 may send a request to client 110 for resources to allow UE 130 to perform the requested operation. For example, UE 130 may request that client 110 allow UE 130 to assume remote control of client 110 to allow UE 130 to perform parallel processing using resources on UE 130 and resources on client 110 simultaneously. Alternatively, UE 130 may request that client 110 send portions of operating system code to UE 130, where the requested portions will allow UE 130 to perform the requested operation.

A second alternative embodiment may include a client 110 that operates with a first UE and a second UE. Client 110 may send an instruction and data to both UE's and may have the UE's perform parallel processing independently (e.g., without having the first and second UE share results). Client 110 may further instruct the first UE to begin processing at a determined time before the second UE starts its processing so that processing on the first UE is ahead of processing on the second UE. Client 110 may further instruct the first UE to notify client 110 and/or the second UE if the first UE encounters an error, such as a fatal processing error. The notification may be designed to allow the second UE to stop its processing before hitting the instruction or operation that caused the error. Alternatively, the notification may cause the second UE to turn on monitoring and/or diagnostic logic to determine what instruction or operation caused the fatal error. Operating UE's with an offset may allow errors in code to be quickly and accurately identified and/or may allow partial results to be saved before the error is encountered on the later running UE (e.g., the second UE in the example above).

A third alternative embodiment may allow a UE to advertise its capabilities to one or more clients. Clients may process the advertised information and may select the UE based on the advertised information when the UE is available. A selected UE may perform parallel processing on behalf of one or more clients using bi-directional communication as described in connection with the figures hereinabove.

A fourth alternative embodiment may include a real-time testing environment that includes a client and a number of UE's. The UE's may further be configured with various types of hardware, such as specialized test hardware. The client may select a particular UE based on the type of real-time testing that is being performed. For example, a first UE may have a first test device attached thereto. The client may send an instruction and/or data to the first UE when the client desires to have real-time testing performed on the first test device. Real-time test environments may include other types of hardware, such as target devices and/or code generators for creating code that can be run on the target devices. The client and the selected UE may exchange bi-directional messages while the UE performs real-time testing on behalf of the client.

A fifth alternative embodiment may implement TCE 115 using one or more text-based products. For example, a text-based TCE 115, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based TCE may support one or more commands that support parallel processing using one or more UE's 130.

A sixth alternative embodiment may implement TCE 115 in a graphically-based TCE 115 using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment. The graphically-based TCE may support parallel processing using one or more UE's 130.

A seventh alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the product may use the MATLAB commands to perform parallel processing using one or more UE's 130.

An eighth alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards to monitor UE 130, etc.).

A ninth alternative embodiment may employ a copy of TCE 115 on both client 110 and UE 130, where the TCE's allow workspace sharing. For example, client 110 may maintain a first workspace with a copy of TCE 115 running on client 110 and UE 130 may maintain a second workspace with a copy of TCE 115 running thereon. Client 110 may create variables in the first workspace and UE 130 may request the variables from the first workspace and may store the variables in the second workspace when performing parallel processing. UE 130 may further make variables in the second workspace available to another UE 130, client 110, remote controller 140, etc., to further facilitate parallel processing on behalf of client 110 and/or another device. Alternatively, only client 110 may have a workspace, and client 110 may communicatively couple the workspace to UE 130 so that UE 130 can access information therein.

A tenth alternative embodiment may use pointers to facilitate sharing information, such as variables, between client 110 and UE 130. For example, a pointer may link a variable in a workspace on client 110 to one or more processors 135 operating in UE 130. A processor, such as processor 135-1, may request the variable using the pointer when the variable is needed to perform an operation on UE 130. UE 130 and client 110 may exchange variables with each other and/or with other devices using pointers. The use of workspaces and/or pointers may allow client 110 and/or UE 130 to operate with nested functions by passing variables between workspaces on client 110, UE 130 and/or workspaces on other devices.

An eleventh alternative embodiment may perform parallel processing for a model on client 110. For example, client 110 may run a Simulink model that includes a number of subsystems. Client 110 may parse the model based on the subsystems and may send a first subsystem to a first UE and may send the second subsystem to a second UE, where the first and second UE's are each configured as MATLAB-UE's (e.g., by running a version of MATLAB on each UE). The first and second UE's may process their respective subsystems and may request variables from client 110 or from other devices (e.g., from other UE's). For example, client 110 may have a sharable workspace that is communicatively coupled to the first and second UE to allow the UE's access to variables needed to perform processing. The first and second UE's may each produce a result file that is sent back to client 110, where client 110 combines the files and performs a compilation operation to compile the model. Alternatively, the first and second UE's may send the result files to a third UE, where the third UE combines the result files and compiles the model on behalf of client 110.

A twelfth alternative embodiment may perform parallel processing using stream processing techniques. For example, a first UE may perform code generation for a model received from client 110. The first UE may send a result to a second UE and the second UE may perform a portion of a build operation on the generated code. The second UE may send its result to a third UE that performs a compile operation on the result received from the second UE. The third UE may generate a result that includes the compiled code and may send the result to client 110.

A thirteenth alternative embodiment may perform parallel processing on behalf of a client using one or more commercial computing grids. For example, client 110 may send a request for parallel processing to a server that operates with a commercial computing grid, where the commercial computing grid provides parallel processing resources to clients for a fee (e.g., a fee based on an amount of processing resources used by client 110). The commercial computing grid may contain one or more clusters that can be associated with one or more providers (e.g., computing service providers). Client 110 may rent time (e.g., during a rental period) on the grid and may perform parallel processing during the rental period. For example, client 110 may exchange bi-directional messages with one or more clusters within the grid, one or more devices within a cluster, etc., during the rental period. Rented resources may request state information from client 110 (e.g., information about available memory, information about variables, information about programming code, information about functions, etc.). Rented resources may also task client 110 to perform operations (e.g., processing activities, sending information, etc.) on behalf of the rented resources. For example, a device in a cluster may request that client 110 perform processing to convert a data value from a first format to a second format before client 110 sends the data value to the requesting device. Client 110 and the cluster(s) used to perform parallel processing on behalf of client 110 may operate in a homogeneous or heterogeneous configuration depending on particular implementations used to perform parallel processing.

A fourteenth alternative embodiment may run a technical computing environment that includes MATLAB on client 110 and on UE 130. Client 110 may send MATLAB instructions (e.g., code, files, function handles, etc.), MATLAB-compatible instructions (e.g., an instruction that is in a non-MATLAB language but that can be recognize and executed in MATLAB), and/or other types of instructions to UE 130 for processing thereon. UE 130 may in turn send MATLAB instructions, MATLAB-compatible instructions, and/or other types of instructions to client 110 for processing thereon. For example, UE 130 may ask client 110 to evaluate a MATLAB function and to pass a result back to UE 130, where UE 130 uses the result to perform parallel processing on behalf of client 110.

A fifteenth alternative embodiment may use parallel processing resources (e.g., UE's 130) to perform optimizations for client 110. For example, client 110 may request that UE 130 evaluate an expression to determine whether the expression can be optimized. UE 130 may send a request to client 110 for additional information (e.g., may request that client 110 provide state information to UE 130), may request that client 110 perform a portion of the processing, etc., while UE 130 operates on the optimization problem. UE 130 may provide a result to client 110 that includes an optimized expression. Client 110 may use the optimized expression in an application to produce a useful and/or tangible result for a user of client 110 and/or a device associated with client 110.

In a sixteenth alternative embodiment, a first UE can act as a client with respect to a second UE, a third UE, etc. For example, client 110 may request that the first UE perform parallel processing. Client 110 and the first UE may exchange bi-directional messages while the first UE performs parallel processing. The first UE may determine that it can use additional parallel processing resources from a second UE and a third UE. The first UE may perform bi-directional communication with the second UE and the third UE to allow the second UE and third UE to assist the first UE with performing parallel processing on behalf of client 110. Configurations can include substantially any number of clients and UE's arranged in any type of hierarchical relationship without departing from the spirit of the invention.

In a seventeenth alternative embodiment, client 110 may use UE 130 to perform parallel processing. Client 110 may send a problem to UE 130 for processing. Client 110 may attempt to anticipate the types of information that UE 130 will request while performing processing. For example, client 110 may anticipate that UE 130 will request a function call and a list of variables. Client 110 may send the function call and list of variables to UE 130 before UE 130 sends a request for the function call and list of variables to client 110. In this embodiment, client 110 sends a speculative response to UE 130 before UE 130 sends a query to client 110. The use of speculative responses can reduce the number of message exchanges that occur between client 110 and UE 130.

In an eighteenth alternative embodiment, client 110 can communicate with UE 130 using communication layers that may include message passing interface (MPI) libraries and/or socket libraries. For example, when UE 130 is installed on client 110, messages exchanged between client 110 and UE 130 may occur via shared memory communication. In contrast, communication may take place over a TCP/IP connection when client 110 and UE 130 do not reside on a single device. The communication layers can be adapted to operate with any of a number of networking protocols and/or over types of networks, such as, but not limited to, ad hoc wireless networks, quantum networks, etc.

Still other alternative implementations are possible consistent with the spirit of the invention.

Embodiments described herein produce useful and tangible results. For example, tangible results (e.g., results that can be perceived by a human) can be produced when a result is displayed to a user, when a device makes a sound, vibrates, performs an operation (e.g., moves, interacts with a person, etc.), etc. Useful results may include storage operations, transmission operations (e.g., sending information or receiving information), display operations, displacement operations, etc. Tangible and/or useful results may include still other activities, operations, etc., without departing from the spirit of the invention.

CONCLUSION

Implementations may provide devices and techniques that allow parallel processing to be performed using bi-directional communication between a client and one or more UE's, where the UE's perform parallel processing on behalf of the client.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 10, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1A-F, 2 and 3 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method for performing parallel processing on behalf of a technical computing environment operating on a client, the method comprising:
sending a request to a plurality of units of execution, where:
the request includes code identifying a sequence of execution, the code is sent to a first unit of execution and a second unit of execution, the first unit of execution executes a first portion of the code based on information associated with the first unit of execution, and the second unit of execution executes a second portion of the code based on information associated with the second unit of execution,
and where the plurality of units of execution:
perform parallel processing on behalf of the client, and comprises:
the first unit of execution, and
the second unit of execution, where
the first unit of execution and the second unit of execution participate in the parallel processing on behalf of the client,
the first unit of execution executes the first portion of the code, the first unit of execution produces a first result during the parallel processing when the first portion of the code is executed,
the second unit of execution executes the second portion of the code, the second unit of execution produces a second result during the parallel processing when the second portion of code is executed,
the first result and the second result collectively form a parallel processing result on behalf of the client when the parallel processing is completed by the first unit of execution and the second unit of execution, and
the parallel processing result indicates that the first unit of execution executed the first portion of the code and that the second unit of execution executed the second portion of the code, where the first portion of the code can differ from the second portion of the code;
receiving a query from the first unit of execution, where the query is: related to the parallel processing performed on behalf of the technical computing environment operating on the client and client state information, wherein the client state information comprises:
information about files on the client, variables on the client, functions on the client, data on the client, memory on the client, processing resources on the client, hardware communicatively coupled to the client, or permissions on the client,
and the query is received from the first unit of execution while the first unit of execution is participating in the parallel processing on behalf of the technical computing environment operating on the client, where:
the participating in the parallel processing indicates that the first unit of execution has begun executing the first portion of the code for producing the first result but the first unit of execution has not computed the first result by completing the executing of the first portion of the code when the query is provided by the first unit of execution;
receiving the first result from the first unit of execution, where the first result is:
produced by the first unit of execution in response to the first unit of execution participating in the parallel processing on behalf of the technical computing environment operating on the client by executing the first portion of the code, and
generated after the first unit of execution receives an answer to the query while the first unit of execution is participating in the parallel processing on behalf of the technical computing environment operating on the client; and using the first result to perform an operation on behalf of: a user, or the technical computing environment.

2. The method of claim 1, wherein the query comprises an instruction for the client associated with the technical computing environment.

3. The method of claim 1, wherein the request is sent to the first unit of execution based on an advertisement associated with the first unit of execution.

4. The method of claim 1, wherein the first result is used by the client to generate code.

5. The method of claim 1, wherein the query is based on a plurality of folded queries, or
wherein the parallel processing result includes a plurality of results, the plurality of results including the first result or the second result and folded into the result.

6. The method of claim 1, wherein the answer is provided to the first unit of execution in response to the query, where the query comprises a request for information, instructions, or resources, where the information, instructions or resources are on the client or are on another device in communication with the client.

7. The method of claim 1, wherein the sending is performed by a remote controller operating on behalf of the technical computing environment.

8. The method of claim 1, wherein the technical computing environment is MATLAB software, Simulink software, MATLAB-compatible software, or Simulink-compatible software.

9. The method of claim 1, wherein the first unit of execution processes MATLAB-compatible instructions or Simulink-compatible instructions.

10. The method of claim 1, wherein the request or the answer comprises MATLAB code, MATLAB-compatible code, or a function handle.

11. The method of claim 1, wherein the answer is generated in response to a task performed on behalf of the first unit of execution.

12. The method of claim 11, wherein the task is performed based on information in the query.

13. The method of claim 1, wherein the request, the query, or the answer are sent or received over a communication medium.

14. The method of claim 13, wherein the communication medium comprises a transmission control protocol internet protocol (TCP/IP), a message passing interface (MPI) protocol, a quantum networking protocol, an ad hoc networking protocol, or a socket based protocol.

15. The method of claim 13, wherein the communication medium comprises a wireless channel or a wired channel.

16. The method of claim 1, wherein the request, the query, or the answer are sent over an encrypted network, an unencrypted network, an ad hoc network, or a quantum network.

17. A non-transitory computer-readable medium comprising executable instructions for performing parallel processing on behalf of a technical computing environment, the medium comprising:
instructions for sending a request to a plurality of units of execution, where:
the request includes code identifying a sequence of execution,
the code is sent to a first unit of execution and a second unit of execution,
the first unit of execution executes a first portion of the code based on information associated with the first unit of execution, and
the second unit of execution executes a second portion of the code based on information associated with the second unit of execution,
and where the plurality of units of execution are for performing parallel processing on behalf of a client that includes the technical computing environment and comprises;
instructions for the first unit of execution, and
the second unit of execution, where
the first unit of execution and the second unit of execution participate in the parallel processing on behalf of the client,
the first unit of execution executes the first portion of the code,
the first unit of execution produces a first result during the parallel processing when the first portion of the code is executed,
the second unit of execution executes the second portion of the code,
the second unit of execution produces a second result during the parallel processing when the second portion of code is executed,
the first result and the second result collectively form a parallel processing result on behalf of the client when the parallel processing is completed by the first unit of execution and the second unit of execution, and
instructions for receiving a query from the first unit of execution, where:
the query is related to the parallel processing performed on behalf of the technical computing environment and client state information, where the client state information comprises:
information about files on the client, variables on the client, functions on the client, data on the client, memory on the client, processing resources on the client, hardware communicatively coupled to the client, or permissions on the client, and
the query is received from the first unit of execution while the first unit of execution is participating in the parallel processing on behalf of the technical computing environment, where:
the participating in the parallel processing indicates that the first unit of execution has begun executing the first portion of the code for producing the first result but the first unit of execution has not computed the first result by completing the executing of the first portion of the code when the query is provided by the first unit of execution;
instructions for receiving a result from the first unit of execution, the result:
produced by the first unit of execution in response to the first unit of execution participating in the parallel processing on behalf of the technical computing environment operating on the client by executing the first portion of the code, and
produced after the first unit of execution receives an answer to the query while the first unit of execution is participating in the parallel processing on behalf of the technical computing environment operating on the client; and
instructions for using the result to perform an operation on behalf of a user or on behalf of the technical computing environment.

18. The medium of claim 17, wherein the query comprises an instruction for the client associated with the technical computing environment.

19. The medium of claim 17, wherein the request is a command, a return value or a callback.

20. The medium of claim 17, wherein the request is sent to the first unit of execution based on an advertisement associated with the first unit of execution.

21. The medium of claim 17, wherein the first unit of execution performs dynamic operations on behalf of the technical computing environment.

22. The medium of claim 17, wherein the result is used by the client to generate code.

23. The medium of claim 17, wherein the query is based on a plurality of folded queries, or
wherein the result includes a plurality of results, the plurality of results folded into the result.

24. The medium of claim 17, wherein the answer is provided to the first unit of execution in response to the query, where the query comprises a request for information, instructions, or resources, where the information, instructions or resources are on the client or are on another device in communication with the client.

25. The medium of claim 17, wherein the sending the request is performed by a remote controller operating on behalf of the technical computing environment.

26. The medium of claim 17, wherein the technical computing environment is MATLAB software, Simulink software, MATLAB-compatible software, or Simulink-compatible software.

27. The medium of claim 17, wherein the first unit of execution processes MATLAB-compatible instructions or Simulink-compatible instructions.

28. The medium of claim 17, wherein the parallel processing involves code generation.

29. The medium of claim 17, wherein the first unit of execution includes a second technical computing environment.

30. The medium of claim 17, wherein the technical computing environment is associated with the client when the client maintains a heterogeneous configuration or a homogeneous configuration with respect to the first unit of execution.

31. The medium of claim 17, wherein the technical computing environment includes a workspace that is communicatively coupled to the first unit of execution.

32. The medium of claim 17, wherein the technical computing environment includes a workspace that maintains a link to the first unit of execution, where the link allows the first unit of execution to access information used in the parallel processing.

33. The medium of claim 32, wherein the information is a variable and wherein the first unit of execution retrieves the variable using the link.

34. The medium of claim 32, wherein the link is a pointer.

35. The medium of claim 17, wherein the first unit of execution is statically configured or dynamically configured.

36. The medium of claim 17, wherein the parallel processing comprises task parallel processing, data parallel processing or stream parallel processing.

37. The medium of claim 17, wherein the request or the answer comprises MATLAB code, MATLAB-compatible code, or a function handle.

38. The medium of claim 17, wherein the answer is generated in response to a task performed on behalf of the first unit of execution.

39. The medium of claim 38, wherein the task is performed based on information in the query.

40. The medium of claim 17, wherein the request, the query, or the answer are sent or received over a communication medium.

41. The medium of claim 40, wherein the communication medium uses a transmission control protocol internet protocol (TCP/IP), a message passing interface (MPI) protocol, a quantum networking protocol, an ad hoc networking protocol, or a socket based protocol.

42. The medium of claim 40, wherein the communication medium comprises a wireless channel or a wired channel.

43. The medium of claim 17, wherein the request, the query, or the answer are sent over an encrypted network, an unencrypted network, an ad hoc network, or a quantum network.

44. A non-transitory computer-readable medium comprising executable instructions for performing parallel processing on behalf of a client operating a technical computing environment, the medium comprising:
instructions for receiving a request from the client, where:
the request includes code identifying a sequence of execution,
the code is sent to a first unit of execution and a second unit of execution,
the first unit of execution executes a first portion of the code based on information associated with the first unit of execution, and
the second unit of execution executes a second portion of the code based on information associated with the second unit of execution, and
instructions for commencing parallel processing on behalf of the client based on the received request;
instructions for the first unit of execution and the second unit of execution, where
the first unit of execution and the second unit of execution participate in the parallel processing on behalf of the client,
the first unit of execution executes the first portion of the code, the first unit of execution produces a first result during the parallel processing when the first portion of the code is executed,
the second unit of execution executes the second portion of the code, the second unit of execution produces a second result during the parallel processing when the second portion of code is executed,
the first result and the second result collectively form a parallel processing result on behalf of the client when the parallel processing is completed by the first unit of execution and the second unit of execution, and
instructions for sending a query to the client, the query:
related to the parallel processing and client state information, wherein the client state information comprises:
information about resources on the client, files on the client, variables on the client, functions on the client, data on the client, memory on the client, processing resources on the client, hardware communicatively coupled to the client, or permissions on the client that are used by at least one of the units of execution to perform parallel processing,
and the query is sent to the client while the parallel processing is being performed on behalf of the client, where;
performing parallel processing indicates that the first unit of execution has begun executing the first portion of the code for producing the first result but the first unit of execution has not computed the first result by completing the executing of the first portion of the code when the query is provided by the first unit of execution;
instructions for receiving an answer from the client, the answer:
received when the client has processed the query, and
received while the parallel processing is being performed on behalf of the client; and
instructions for generating a result based on the parallel processing, the result used by the client or by another device to perform an operation.

45. The medium of claim 44, further comprising:
instructions for sending the result to the client or to a proxy device operating on behalf of the client.

46. The medium of claim 44, wherein the query is generated by a unit of execution that is one of a plurality of units of execution performing the parallel processing on behalf of the client, and where the query is generated by the unit of execution in response to evaluating the request.

47. The medium of claim 44, wherein the parallel processing uses a plurality of units of execution, and wherein the query includes folded information from a plurality of queries related to at least a subset of the plurality of units of execution.

48. The medium of claim 44, wherein the answer is received from the client based on a request for information, instructions, or resources.

49. The medium of claim 44, wherein the parallel processing is performed using resources obtained from the client using bi-directional communication between the client and a unit of execution.

50. The medium of claim 44, wherein the technical computing environment is MATLAB software, Simulink software, MATLAB-compatible software, or Simulink-compatible software.

51. The medium of claim 44, wherein the parallel processing involves code generation.

52. The medium of claim 44, wherein the parallel processing interacts with a second technical computing environment.

53. The medium of claim 44, wherein the technical computing environment is a heterogeneous configuration or a homogeneous configuration with respect to a configuration related to the parallel processing.

54. The medium of claim 44, wherein the technical computing environment includes a workspace that is communicatively coupled to a unit of execution.

55. The medium of claim 44, wherein the technical computing environment includes a workspace that maintains a link to a unit of execution, where the link allows the unit of execution to access information used in the parallel processing.

56. The medium of claim 55, wherein the information is a variable and wherein the unit of execution retrieves the variable using the link.

57. The medium of claim 55, wherein the link is a pointer.

58. The medium of claim 44, wherein the parallel processing is performed at least in part using a device that is statically configured or dynamically configured.

59. The medium of claim 44, wherein the parallel processing is task parallel processing, data parallel processing, or stream parallel processing.

60. The medium of claim 44, wherein the client performs a task on behalf of a unit of execution in response to the query.

61. The medium of claim 44, wherein the request, the query or the answer comprises MATLAB code, MATLAB-compatible code, or a function handle.

62. The medium of claim 44, wherein the request, the query, or the answer are sent or received over a communication medium.

63. The medium of claim 62, wherein the communication medium comprises a transmission control protocol internet protocol (TCP/IP), a message passing interface (MPI) protocol, a quantum networking protocol, an ad hoc networking protocol, or a socket based protocol.

64. The medium of claim 62, wherein the communication medium comprises a wireless channel or a wired channel.

65. The medium of claim 44, wherein the request, the query, or the answer are sent over an encrypted network, an unencrypted network, an ad hoc network, or a quantum network.

66. A computing device operating in a parallel processing system, comprising:
a first processor to:
send a request for parallel processing to a plurality of units of execution, where:
the request is on behalf of a technical computing environment, and the request includes code identifying a sequence of execution, the code is sent to a first unit of execution and a second unit of execution, the first unit of execution executes a first portion of the code based on information associated with the first unit of execution, and the second unit of execution executes a second portion of the code based on information associated with the second unit of execution, and
the plurality of units of execution concurrently operate to perform the parallel processing on behalf of the technical computing environment,
the first unit of execution executes the first portion of the code, the first unit of execution produces a first result during the parallel processing when the first portion of the code is executed,
the second unit of execution executes the second portion of the code, the second unit of execution produces a second result during the parallel processing when the second portion of code is executed,
the first result and the second result collectively form a parallel processing result on behalf of the client when the parallel processing is completed by the first unit of execution and the second unit of execution, and
the parallel processing result indicates that the first unit of execution executed the first portion of the code and that the second unit of execution executed the second portion of the code, where the first portion of the code can differ from the second portion of the code;
receive a query from at least one of the plurality of units of execution, where the query is:
related to the parallel processing and requests client state information, wherein the client state information comprises:
information about a resource on the computing device, a file on the computing device, a variable on the computing device, a function on the computing device, data on the computing device, memory on the computing device, processing cycles on the computing device, hardware communicatively coupled to the computing device, or a permission used by at least one of the plurality of units of execution to perform parallel processing, and
received while the at least one unit of execution is participating in the parallel processing, where:
the participating in the parallel processing indicates that the first unit of execution has begun executing the first portion of the code for producing the first result but the first unit of execution has not computed the first result by completing the executing of the first portion of the code when the query is provided by the first unit of execution; and
received before the unit of execution produces a result in response to participating in the parallel processing, and
receive a result from the unit of execution, where the result is:
produced in response to the parallel processing, and produced after the unit of execution has sent the query; and a second processor to:
　process the result, and perform an operation based on the processing the result.

67. The computing device of claim 66, wherein the query includes instructions to access or operate a device operatively coupled to the computing device.

68. The computing device of claim 66, wherein the technical computing environment is MATLAB software, Simulink software, MATLAB-compatible software, or Simulink-compatible software.

69. The computing device of claim 66, wherein the computing device maintains a workspace that is accessible by the unit of execution during the parallel processing.

70. The computing device of claim 69, wherein the workspace includes a variable that is accessible by the unit of execution.

71. The computing device of claim 66, wherein the computing device maintains a pointer to the unit of execution, where the unit of execution uses the pointer to identify information on the computing device.

72. The computing device of claim 71, wherein the information includes a variable.

73. The computing device of claim 66, wherein the parallel processing comprises task parallel processing, data parallel processing, or stream parallel processing.

74. A system, comprising:
　a first processor to:
　　identify at least one unit of execution based on information in a request, where the at least one unit of execution is one of a plurality of units of execution configured to perform parallel processing on behalf of a requesting device,
　　process a query received from the unit of execution, the query:
　　related to parallel processing performed on behalf of the requesting device operating a technical computing environment, and client state information, wherein the client state information comprises:
　　information about resources on the client, files on the client, variables on the client, functions on the client, data on the client, memory on the client, processing resources on the client, hardware communicatively coupled to the client, or permissions on the client that are used by at least one of the units of execution to perform parallel processing, and
　　received when the at least one unit of execution is participating in the parallel processing with at least one other of the plurality of units of execution, where:
　　participating in parallel processing indicates that a first unit of execution has begun executing a first portion of a code for producing a first result but the first unit of execution has not computed the first result by completing the executing of the first portion of the code when the query is provided by the first unit of execution;
　　and
　　generate an answer to the query; and
　a second processor to:
　　receive the request on behalf of the requesting device, send the request to the at least one unit of execution, where the request is related to parallel processing and the request includes said code identifying a sequence of execution, the code is sent to the first unit of execution and a second unit of execution, the first unit of execution executes a first portion of the code based on information associated with the first unit of execution, and the second unit of execution executes a second portion of the code based on information associated with the second unit of execution,
　　where the at least one unit of execution performs at least a portion of the parallel processing on behalf of the requesting device, and
　　the first unit of execution and the second unit of execution participate in the parallel processing on behalf of the client,
　　the first unit of execution executes the first portion of the code, the first unit of execution produces a first result during the parallel processing when the first portion of the code is executed,
　　the second unit of execution executes the second portion of the code, the second unit of execution produces a second result during the parallel processing when the second portion of code is executed,
　　the first result and the second result collectively form a parallel processing result on behalf of the client when the parallel processing is completed by the first unit of execution and the second unit of execution, and
　　the parallel processing result indicates that the first unit of execution executed the first portion of the code and that the second unit of execution executed the second portion of the code, where the first portion of the code can differ from the second portion of the code;
　　the parallel processing further generating a result, generated after the first unit of execution receives an answer to the query while the first unit of execution is participating in the parallel processing on behalf of the technical computing environment operating on the client; and where the result is processed by the requesting device to perform an operation, and
　　receive the query prior to the requesting device processing the result.

75. The system of claim 74, wherein the system operates on behalf of the requesting device according to a subscription.

76. The system of claim 74, wherein the system maintains a database storing information about the plurality of units of execution.

77. The system of claim 74, wherein the unit of execution is selected based on a parameter.

78. The system of claim 74, wherein the request, the query, or the parallel processing are associated with specialized hardware or a target device.

79. The system of claim 74, wherein the technical computing environment is MATLAB software, Simulink software, MATLAB-compatible software, or Simulink-compatible software.

80. The system of claim 74, wherein the system includes a workspace that is accessible to the requesting device or the unit of execution.

81. The system of claim 74, wherein the parallel processing comprises task parallel processing, data parallel processing, or stream parallel processing.

82. A non-transitory computer readable medium comprising executable instructions for performing parallel processing on behalf of a technical computing environment, the medium comprising:
　instructions for passing a request from the technical computing environment to one or more clusters operating on a computing grid to perform parallel processing;
　the request includes code identifying a sequence of execution, the code is sent to a first unit of execution and a second unit of execution, the first unit of execution executes a first portion of the code based on information associated with the first unit of execution, and the second unit of execution executes a second portion of the code based on information associated with the second unit of execution, and where the one or more clusters includes the first unit of execution and the second unit of execution, where the first unit of execution and the second unit of execution participate in the parallel processing on behalf of the client, the first unit of execution executes the first portion of the code, the first unit of execution produces a first result during the parallel processing when the first portion of the code is executed, the second unit of execution executes the second portion of the code, the second unit of execution produces a second result during the parallel processing when the second portion of code is executed, the first result and the second result collectively form a parallel processing result on behalf of the client when the parallel processing is completed by the first unit of execution and the second unit of execution, and the parallel processing result indicates that the first unit of execution executed the first portion of the code and that the second unit of execution executed the second portion of the code, where the first portion of the code can differ from the second portion of the code;

instructions for passing a query from one of the one or more clusters to the technical computing environment when the one of the one or more clusters is performing parallel processing;

where the query is:

related to the parallel processing performed on behalf of the technical computing environment operating on the client and client state information, wherein the client state information comprises:

information about files on the client, variables on the client, functions on the client, data on the client, memory on the client, processing resources on the client, hardware communicatively coupled to the client, or permissions on the client, and performing parallel processing indicates that the first unit of execution has begun executing the first portion of the code for producing the first result but the first unit of execution has not computed the first result by completing the executing of the first portion of the code when the query is provided by the first unit of execution;

instructions for passing an answer to the one of the one or more clusters, where the answer is generated in response to the query; and instructions for passing a result from the one of the one or more clusters to the technical computing environment, where the first result is:

produced by the first unit of execution in response to the first unit of execution participating in the parallel processing on behalf of the technical computing environment by executing the first portion of the code, and generated after the first unit of execution receives an answer to the query while the first unit of execution is participating in the parallel processing on behalf of the technical computing environment, and where the technical computing environment uses the result to perform processing on behalf of a user or a device.

83. The computer readable medium of claim 82, wherein the one or more clusters are on a commercial computing grid.

* * * * *